US011755023B2

(12) United States Patent
Ready-Campbell et al.

(10) Patent No.: US 11,755,023 B2
(45) Date of Patent: *Sep. 12, 2023

(54) OBSTACLE DETECTION AND MANIPULATION BY A VEHICLE WITHIN A DIG SITE

(71) Applicant: Built Robotics Inc., San Francisco, CA (US)

(72) Inventors: Noah Austen Ready-Campbell, San Francisco, CA (US); Andrew Xiao Liang, San Francisco, CA (US); Christian John Wawrzonek, San Francisco, CA (US); Cyrus Mcmann Ready-Campbell, San Francisco, CA (US); Gaurav Jitendra Kikani, Sugar Land, CA (US)

(73) Assignee: BUILT ROBOTICS INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/198,118

(22) Filed: Mar. 10, 2021

(65) Prior Publication Data

US 2021/0191409 A1   Jun. 24, 2021

Related U.S. Application Data

(63) Continuation of application No. 16/931,292, filed on Jul. 16, 2020, which is a continuation of application
(Continued)

(51) Int. Cl.
*G05D 1/02* (2020.01)
*G01C 21/20* (2006.01)

(52) U.S. Cl.
CPC .......... *G05D 1/0219* (2013.01); *G01C 21/20* (2013.01); *G05D 2201/0202* (2013.01)

(58) Field of Classification Search
CPC .. G05D 3/00; G05D 1/00; G05D 1/02; G05D 1/021; G05D 1/0214; G05D 1/0217;
(Continued)

(56) References Cited

U.S. PATENT DOCUMENTS 9,213,905 B2    12/2015  Lange et al.
2009/0076674 A1*  3/2009  Kiegerl ................. E02F 9/264
                                                      701/2
2017/0168485 A1   6/2017  Berntorp et al.

FOREIGN PATENT DOCUMENTS

WO   WO-2017180430 A1 * 10/2017 ............. G01C 21/20

OTHER PUBLICATIONS

United States Office Action, U.S. Appl. No. 15/996,408, dated Apr. 16, 2020, ten pages.
(Continued)

*Primary Examiner* — Anthony R Jimenez
(74) *Attorney, Agent, or Firm* — Fenwick & West LLP

(57) ABSTRACT

This description provides an autonomous or semi-autonomous excavation vehicle that is capable of determining a route between a start point and an end point in a site and navigating over the route. The sensors collect any or more of spatial, imaging, measurement, and location data to detect an obstacle between two locations within the site. Based on the collected data and identified obstacles, the excavation vehicle generates unobstructed routes circumventing the obstacles, obstructed routes traveling through the obstacles, and instructions for removing certain modifiable obstacles. The excavation vehicle determines and selects the shortest route of the unobstructed and obstructed route and navigates over the selected path to move within the site.

21 Claims, 11 Drawing Sheets

Related U.S. Application Data

No. 15/996,408, filed on Jun. 1, 2018, now Pat. No. 10,761,537.

(60) Provisional application No. 62/514,341, filed on Jun. 2, 2017.

(58) Field of Classification Search
CPC .. G05D 1/0219; G05D 1/0221; G05D 1/0223; G05D 1/0229; G05D 1/0212; G05D 1/0268; G05D 1/027; G05D 1/0272; G05D 1/0278; G05D 1/0287; G05D 1/0289; G05D 1/04; G05D 1/06; G05D 1/08; G05D 1/0891; G05D 1/10; G05D 2201/02; G05D 2201/0202; G05B 2219/31408; G05B 2219/35212; G01C 21/12; G01C 21/14; G01C 21/20; G01C 21/30; G01C 21/34; G01C 21/3407; G01C 21/3415; G01C 21/3423; G01C 21/3453; G01C 21/3461; G01C 21/3469; G01C 21/3476; G01C 21/3602; G01C 21/3605; G01C 21/3644; G01C 21/3647; G01C 21/3679; G01C 21/3691
See application file for complete search history.

(56) References Cited

OTHER PUBLICATIONS

United States Office Action, U.S. Appl. No. 16/931,292, dated Aug. 3, 2022, 9 pages.
United States Office Action, U.S. Appl. No. 16/952,061, dated Aug. 4, 2022, 9 pages.
United States Office Action, U.S. Appl. No. 16/931,292, dated Feb. 2, 2023, 10 pages.

* cited by examiner

OBSTACLE DETECTION AND MANIPULATION BY A VEHICLE WITHIN A DIG SITE

CROSS REFERENCE TO RELATED APPLICATIONS

This application is a continuation of co-pending U.S. patent application Ser. No. 16/931,292 filed on Jul. 16, 2020, which is a continuation of U.S. Pat. No. 10,761,537 filed on Jun. 1, 2018, which claims the benefit of U.S. Provisional Application No. 62/514,341 filed on Jun. 2, 2017, each of which is incorporated herein by reference in its entirety.

BACKGROUND

Field of Art

The disclosure relates generally to method for excavating earth from a dig site, and more specifically to excavating earth using a vehicle operated using a sensor assembly coupled to control the vehicle.

Description of the Related Art

Vehicles, for example backhoes, loaders, and excavators, generally categorized as excavation vehicles, are used to excavate earth from locations. Currently, operation of these excavation vehicles is very expensive as each vehicle requires a manual operator be available and present during the entire excavation. Further complicating the field, there is an insufficient labor force skilled enough to meet the demand for operating these vehicles. Because they must be operated manually, excavation can only be performed during the day, extending the duration of excavation projects and further increasing overall costs. The dependence of current excavation vehicles on manual operators increases the risk of human error during excavations and reduce the quality of work done at the site.

SUMMARY

Described is an autonomous or semi-autonomous excavation system that unifies an excavation vehicle with a sensor system for excavating earth from a site. The excavation system controls and navigates an excavation vehicle within a site. The excavation system uses a combination of sensors integrated into the excavation vehicle to record the positions and orientations of the various components of the excavation vehicle and/or the conditions of the surrounding earth. Data recorded by the sensors may be aggregated or processed in various ways, for example, to generate digital representations of the site and instructions for excavating earth from the site, determine and control the movement of the vehicle over routes within the site, and perform other tasks described herein.

According to an embodiment, a method for determining a route for the excavation vehicle between a start point and an end point includes detecting an obstacle between the start point and the end point using a sensor mounted to the excavation vehicle. The start and end points are represented as individual coordinates within the coordinate space. A computer communicatively coupled to the excavation vehicle executing a set of instructions including generating, for the detected obstacle, a set of removal tool paths which when executed by the excavation vehicle will remove the obstacle from the site. The computer generates an obstructed route and unobstructed route between start point and the end point. The obstructed route travels through the detected obstacle and the unobstructed route circumvents the detected obstacle. For the obstructed route, the computer evaluates a cost function for the excavation vehicle to navigate from the start point to the end point over a plurality of passes and a secondary cost function for the excavation vehicle to execute the previously generated set of removal tool paths. For the unobstructed route, the computer evaluates a cost function for the excavation vehicle to navigate from the start point to the end point over the plurality of passes. The computer selects the route with the smaller cost value based on the cost functions and navigates the excavation vehicle over the selected route.

The described excavation system reduces the cost of excavating a site by reducing the need for manual labor, by obtaining actionable information that helps design and increase the efficiency of the excavation project, and by improving the overall quality and precision of the project by carrying out consistent, repeatable actions in accordance with excavation plans.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

I. Excavation System

Figure 1:
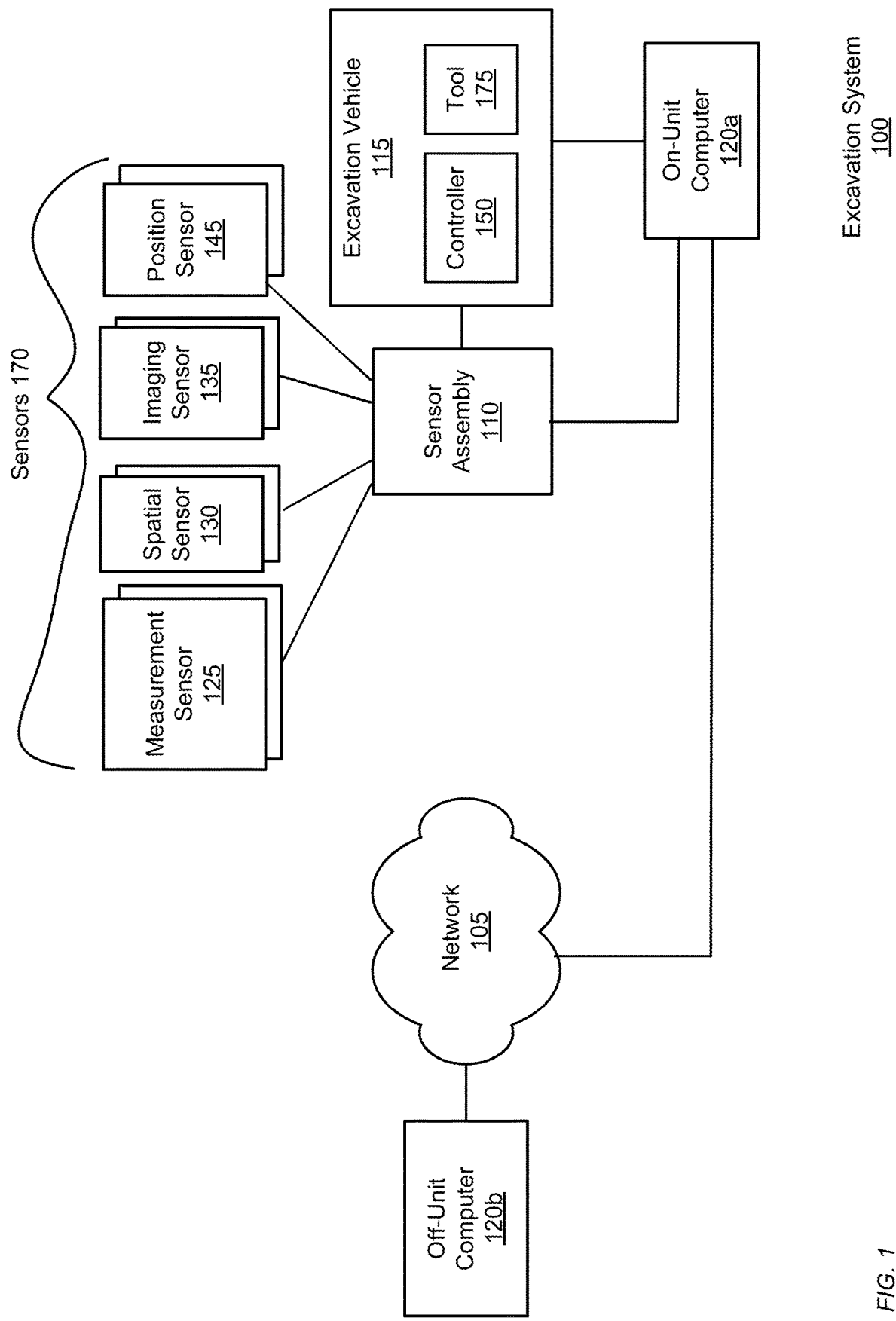
FIG. 1 shows an excavation system for excavating earth, according to an embodiment.
Figure 2A:
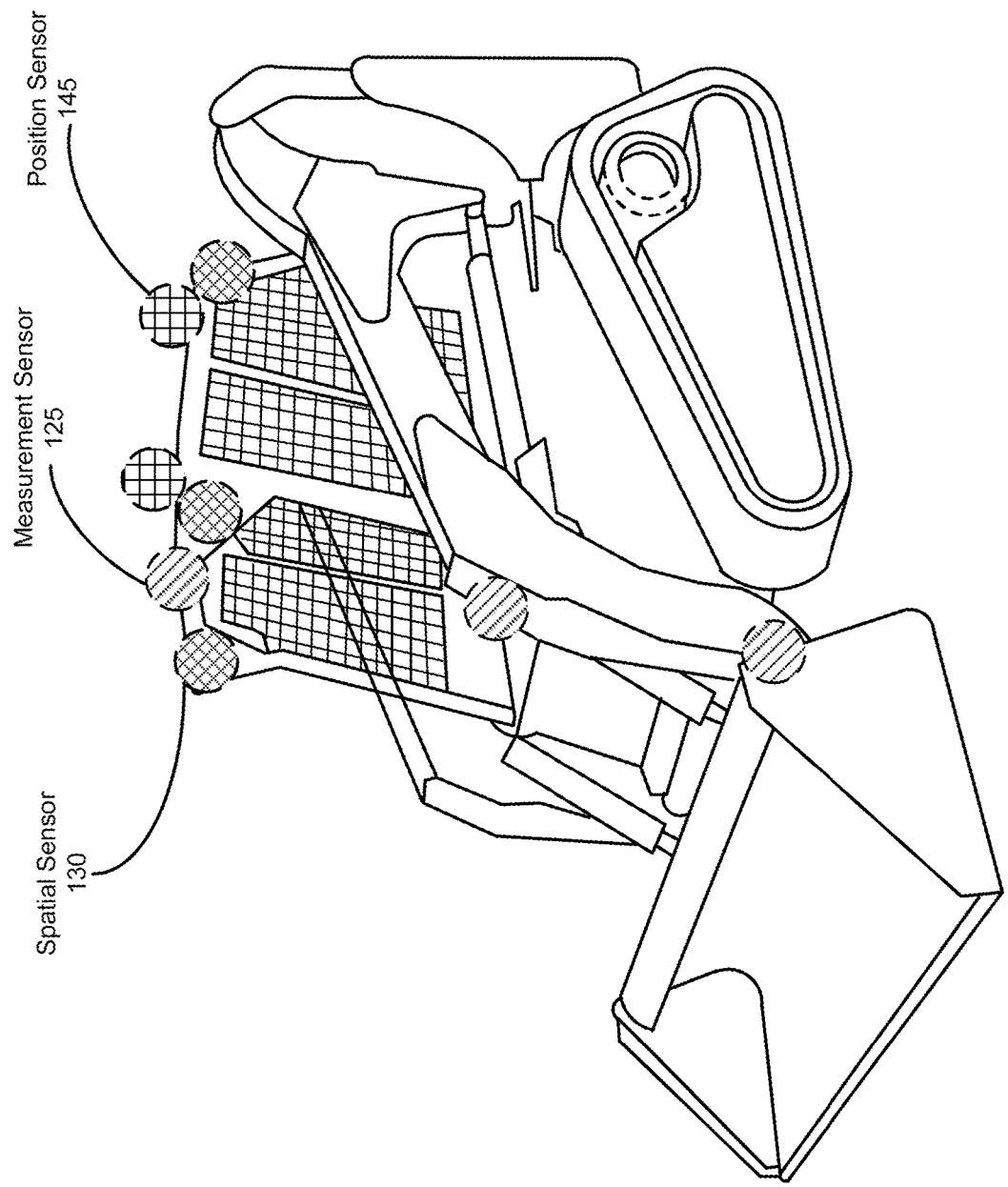
FIG. 2A illustrates the example placement of sensors for a compact track loader, according to an embodiment.
Figure 2B:
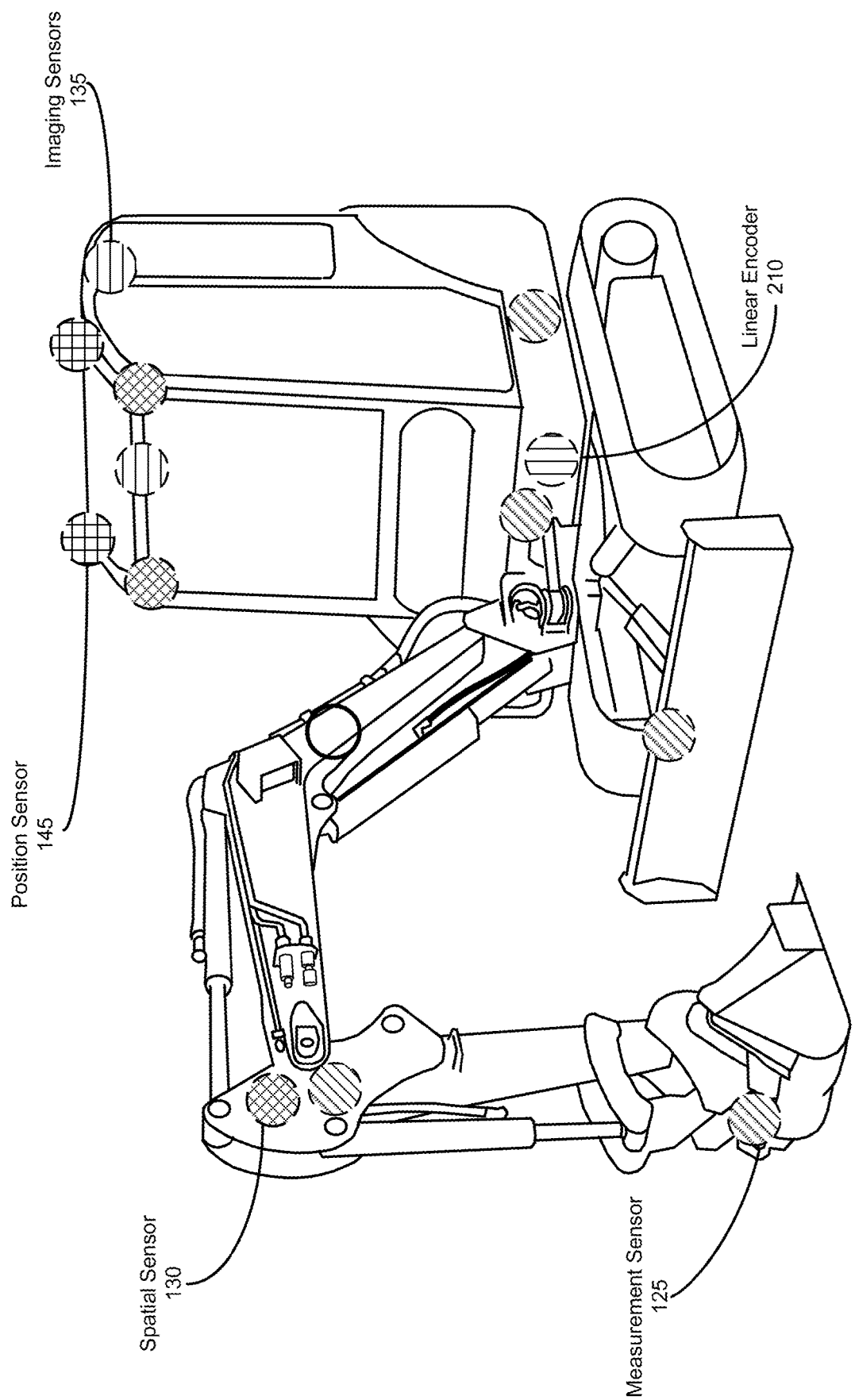
FIG. 2B illustrates the example placement of sensors for an excavator, according to an embodiment.

FIG. 1 shows an excavation system 100 for excavating earth autonomously or semi-autonomously from a dig site using a suite of one or more sensors 170 mounted on an excavation vehicle 115 to record data describing the state of the excavation vehicle 115 and the excavated site. As examples, FIGS. 2A and 2B illustrate the example placement of sensors for a compact track loader and an excavator, respectively, according to example embodiments. FIGS. 1-2B are discussed together in the following section for clarity.

The excavation system 100 includes a set of components physically coupled to the excavation vehicle 115. These include a sensor assembly 110, the excavation vehicle 115 itself, a digital or analog electrical controller 150, and an on-unit computer 120*a*. The sensor assembly 110 includes one or more of any of the following types of sensors: measurement sensors 125, spatial sensors 130, imaging sensors 135, and position sensors 145.

Each of these components will be discussed further below in the remaining sub-sections of FIG. 1. Although FIG. 1 illustrates only a single instance of most of the components of the excavation system 100, in practice more than one of each component may be present, and additional or fewer components may be used different than those described herein.

I.A. Excavation Vehicle

The excavation vehicle 115 is an item of heavy equipment designed to excavate earth from a hole within a dig site. Excavation vehicles 115 are typically large and capable of moving large volumes of earth at a single time, particularly relative to what an individual human can move by hand. As described herein, excavation refers generally to moving earth or materials within the site, for example to dig a hole, fill a hole, level a mound, or to deposit a volume of earth or materials from a first location to a second location. Materials, for example pieces of wood, metal, or concrete may be moved using a forklift, or other functionally similar machines. Generally, excavation vehicles 115 excavate earth by scraping or digging earth from beneath the ground surface. Examples of excavation vehicles 115 within the scope of this description include, but are not limited to loaders such as backhoe loaders, track loaders, wheel loaders, skid steer loaders, scrapers, graders, bulldozers, compactors, excavators, mini-excavators, trenchers, skip loaders.

Among other components, excavation vehicles 115 generally include a chassis 205, a drive system 210, an excavation tool 175, an engine (not shown), an on-board sensor assembly 110, and a controller 150. The chassis 205 is the frame upon on which all other components are physically mounted. The drive system 210 gives the excavation vehicle 115 mobility through the excavation site. The excavation tool 175 includes not only the instrument collecting dirt, such as a bucket or shovel, but also any articulated elements for positioning the instrument for the collection, measurement, and dumping of dirt. For example, in an excavator or loader the excavation tool refers not only the bucket but also the multi-element arm that adjusts the position and orientation of the tool.

The engine powers both the drive system 210 and the excavation tool 175. The engine may be an internal combustion engine, or an alternative power plant, such as an electric motor or battery. In many excavation vehicles 115, the engine powers the drive system 210 and the excavation tool commonly through a single hydraulic system, however other means of actuation may also be used. A common property of hydraulic systems used within excavation vehicles 115 is that the hydraulic capacity of the vehicle 115 is shared between the drive system 210 and the excavation tool. In some embodiments, the instructions and control logic for the excavation vehicle 115 to operate autonomously and semi-autonomously includes instructions relating to determinations about how and under what circumstances to allocate the hydraulic capacity of the hydraulic system.

I.B. Sensor Assembly

As introduced above, the sensor assembly 110 includes a combination of one or more of: measurement sensors 125, spatial sensors 130, imaging sensors 135, and position sensors 145. The sensor assembly 110 is configured to collect data related to the excavation vehicle 115 and environmental data surrounding the excavation vehicle 115. The controller 150 is configured to receive the data from the assembly 110 and carry out the instructions of the excavation routine provided by the computers 120 based on the recorded data. This includes control the drive system 210 to move the position of the tool based on the environmental data, a location of the excavation vehicle 115, and the excavation routine.

Sensors 170 are either removably mounted to the excavation vehicle 115 without impeding the operation of the excavation vehicle 115, or the sensor is an integrated component that is a native part of the excavation vehicle 115 as made available by its manufacturer. Each sensor transmits the data in real-time or as soon as a network connection is achieved, automatically without input from the excavation vehicle 115 or a human operator. Data recorded by the sensors 170 is used by the controller 150 and/or on-unit computer 120*a* for analysis of, generation of and carrying out of excavation routines, among other tasks.

Position sensors 145 provide a position of the excavation vehicle 115. This may be a localized position within a dig site, or a global position with respect latitude/longitude, or some other external reference system. In one embodiment, a position sensor is a global positioning system interfacing with a static local ground-based GPS node mounted to the excavation vehicle 115 to output a position of the excavation vehicle 115.

Spatial sensors 130 output a three-dimensional map in the form of a three-dimensional point cloud representing distances between one meter and fifty meters between the spatial sensors 130 and the ground surface or any objects within the field of view of the spatial sensor 130, in some cases per rotation of the spatial sensor 130. In one embodiment, spatial sensors 130 include a set of light emitters (e.g., Infrared (IR)) configured to project structured light into a field near the excavation vehicle 115, a set of detectors (e.g., IR cameras), and a processor configured to transform data received by the infrared detectors into a point cloud representation of the three-dimensional volume captured by the detectors as measured by structured light reflected by the environment. In one embodiment, the spatial sensor 130 is a LIDAR sensor having a scan cycle that sweeps through an angular range capturing some or all of the volume of space surrounding the excavation vehicle 115. Other types of spatial sensors 130 may be used, including time-of-flight sensors, ultrasonic sensors, and radar sensors.

Imaging sensors 135 capture still or moving-video representations of the ground surface, objects, and environment surrounding the excavation vehicle 115. Examples imaging sensors 135 include, but are not limited to, stereo RGB cameras, structure from motion cameras, and monocular RGB cameras. In one embodiment, each camera can output a video feed containing a sequence of digital photographic images at a rate of 20 Hz. In one embodiment, multiple imaging sensors 135 are mounted such that each imaging sensor captures some portion of the entire 360 degree angular range around the vehicle. For example, front, rear, left lateral, and right lateral imaging sensors may be mounted to capture the entire angular range around the excavation vehicle 115.

Measurement sensors 125 generally measure properties of the ambient environment, or properties of the excavation vehicle 115 itself. These properties may include tool position/orientation, relative articulation of the various joints of the arm supporting the tool, vehicle 115 speed, ambient temperature, hydraulic pressure (either relative to capacity or absolute) including how much hydraulic capacity is being used by the drive system 210 and the excavation tool separately. A variety of possible measurement sensors 125 may be used, including hydraulic pressure sensors, linear encoders, radial encoders, inertial measurement unit sensors, incline sensors, accelerometers, strain gauges, gyroscopes, and string encoders.

There are a number of different ways for the sensor assembly 110 generally and the individual sensors specifically to be constructed and/or mounted to the excavation vehicle 115. This will also depend in part on the construction of the excavation vehicle 115. Using the compact track loader of FIG. 2A as an example, the representations with diagonal crosshatching represent the example placements of a set of measurement sensors 125, the representation with diamond crosshatching represent example placements of a set of spatial sensors 130, and the representations with grid crosshatching represent example placements of a set of position sensors 145. Using the excavator of FIG. 2B as another example, diagonal crosshatchings represent measurement sensors 125, diamond crosshatchings represent spatial sensors 130, and grid crosshatchings represent position sensors 145. Additionally vertical crosshatchings near the drive system 210 represent example placements for a linear encoder 210 and horizontal crosshatchings near the roof represent imaging sensors 135, for example RGB cameras.

Generally, individual sensors as well as the sensor assembly 110 itself range in complexity from simplistic measurement devices that output analog or electrical systems electrically coupled to a network bus or other communicative network, to more complicated devices which include their own onboard computer processors, memory, and the communications adapters (similar to on-unit computer 120a). Regardless of construction, the sensors and/or sensor assembly together function to record, store, and report information to the computers 120. Any given sensor may record or the sensor assembly may append to recorded data a time stamps for when data was recorded.

The sensor assembly 110 may include its own network adapter (not shown) that communicates with the computers 120 either through either a wired or wireless connection. For wireless connections, the network adapter may be a Bluetooth Low Energy (BTLE) wireless transmitter, infrared, or 802.11 based connection. For wired connection, a wide variety of communications standards and related architecture may be used, including Ethernet, a Controller Area Network (CAN) Bus, or similar.

In the case of a BTLE connection, After the sensor assembly 110 and on-unit computer 120a have been paired with each other using a BLTE passkey, the sensor assembly 110 automatically synchronizes and communicates information relating to the excavation of a site to the on-site computer 120a. If the sensor assembly 110 has not been paired with the on-unit computer 120 prior to the excavation of a site, the information is stored locally until such a pairing occurs. Upon pairing, the sensor assembly 110 communicates any stored data to the on-site computer 120a.

The sensor assembly 110 may be configured to communicate received data to any one of the controller 150 of the excavation vehicle 115, the on-unit computer 120a, as well as the off-unit computer 120b. For example, if the network adapter of the sensor assembly 110 is configured to communicate via a wireless standard such as 802.11 or LTE, the adapter may exchange data with a wireless access point such as a wireless router, which may in turn communicate with the off-unit computer 120b and also on-unit computer 120a. This type of transmission may be redundant, but it can help ensure that recorded data arrives at the off-unit computer 120b for consumption and decision making by a manual operator, while also providing the data to the on-unit computer 120a for autonomous or semi-autonomous decision making in the carrying out of the excavation plan.

I.C. On-Unit Computer

Data collected by the sensors 170 is communicated to the on-unit computer 120a to assist in the design or carrying out of an excavation routine. Generally, excavation routines are sets of computer program instructions that, when executed control the various controllable inputs of the excavation vehicle 115 to carry out an excavation-related task. The controllable input of the excavation vehicle 115 may include the joystick controlling the drive system 210 and excavation tool and any directly-controllable articulable elements, or some controller 150 associated input to those controllable elements, such as an analog or electrical circuit that responds to joystick inputs.

Generally, excavation-related tasks and excavation routines are broadly defined to include any task that can be feasibly carried out by an excavation routine. Examples include, but are not limited to: dig site preparation routines, digging routines, fill estimate routines, volume check routines, dump routines, wall cutback routines, backfill/compaction routines. Examples of these routines are described further below. In addition to instructions, excavation routines include data characterizing the site and the amount and locations of earth to be excavated. Examples of such data include, but are not limited to, a digital file, sensor data, a digital terrain model, and one or more tool paths. Examples of such data are further described below.

The excavation vehicle 115 is designed to carry out the set of instructions of an excavation routine either entirely autonomously or semi-autonomously. Here, semi-autonomous refers to an excavation vehicle 115 that not only responds to the instructions but also to a manual operator. Manual operators of the excavation vehicle 115 may be monitor the excavation routine from inside of the excavation vehicle 115 using the on-unit computer 120a or remotely using an off-unit computer 120b from outside of the excavation vehicle, on-site, or off-site. Manual operation may take the form of manual input to the joystick, for example. Sensor data is received by the on-unit computer 120a and assists in the carrying out of those instructions, for example by modifying exactly what inputs are provided to the controller 150 in order to achieve the instructions to be accomplished as part of the excavation routine.

The on-unit computer 120a may also exchange information with the off-unit computer 120b and/or other excavation vehicles (not shown) connected through network 105. For example, an excavation vehicle 115 may communicate data recorded by one excavation vehicle 115 to a fleet of additional excavation vehicle 115s that may be used at the same site. Similarly, through the network 105, the computers 120 may deliver data regarding a specific site to a central location from which the fleet of excavation vehicle 115s are stored. This may involve the excavation vehicle 115 exchanging data with the off-unit computer, which in turn can initiate a process to generate the set of instructions for excavating the earth and to deliver the instructions to another excavation vehicle 115. Similarly, the excavation vehicle 115 may also receive data sent by other sensor assemblies 110 of other excavation vehicles 115 as communicated between computers 120 over network 105.

The on-unit computer 120a may also process the data received from the sensor assembly 110. Processing generally takes sensor data that in a "raw" format may not be directly usable, and converts into a form that useful for another type of processing. For example, the on unit computer 120a may fuse data from the various sensors into a real-time scan of the ground surface of the site around the excavation vehicle 115. This may comprise fusing the point clouds of various spatial sensors 130, the stitching of images from multiple imaging sensors 135, and the registration of images and point clouds relative to each other or relative to data regarding an external reference frame as provided by position sensors 145 or other data. Processing may also include up sampling, down sampling, interpolation, filtering, smoothing, or other related techniques.

I.D. Off-Unit Computer

The off-unit computer 120b includes a software architecture for supporting access and use of the excavation system 100 by many different excavation vehicles 115 through network 105, and thus at a high level can be generally characterized as a cloud-based system. Any operations or processing performed by the on-unit computer 120a may also be performed similarly by the off-unit computer 120b.

In some instances, the operation of the excavation vehicle 115 is monitored by a human operator. Human operators, when necessary, may halt or override the automated excavation process and manually operate the excavation vehicle 115 in response to observations made regarding the features or the properties of the site. Monitoring by a human operator may include remote oversight of the whole excavation routine or a portion of it. Human operation of the excavation vehicle 115 may also include manual control of the joysticks of the excavation vehicle 115 for portions of the excavation routine (i.e., preparation routine, digging routine, etc.). Additionally, when appropriate, human operators may override all or a part of the set of instructions and/or excavation routine carried out by the on-unit computer 120a.

I.E. General Computer Structure

The on-unit 120a and off-unit 120b computers may be generic or special purpose computers. A simplified example of the components of an example computer according to one embodiment is illustrated in FIG. 3.

Figure 3:
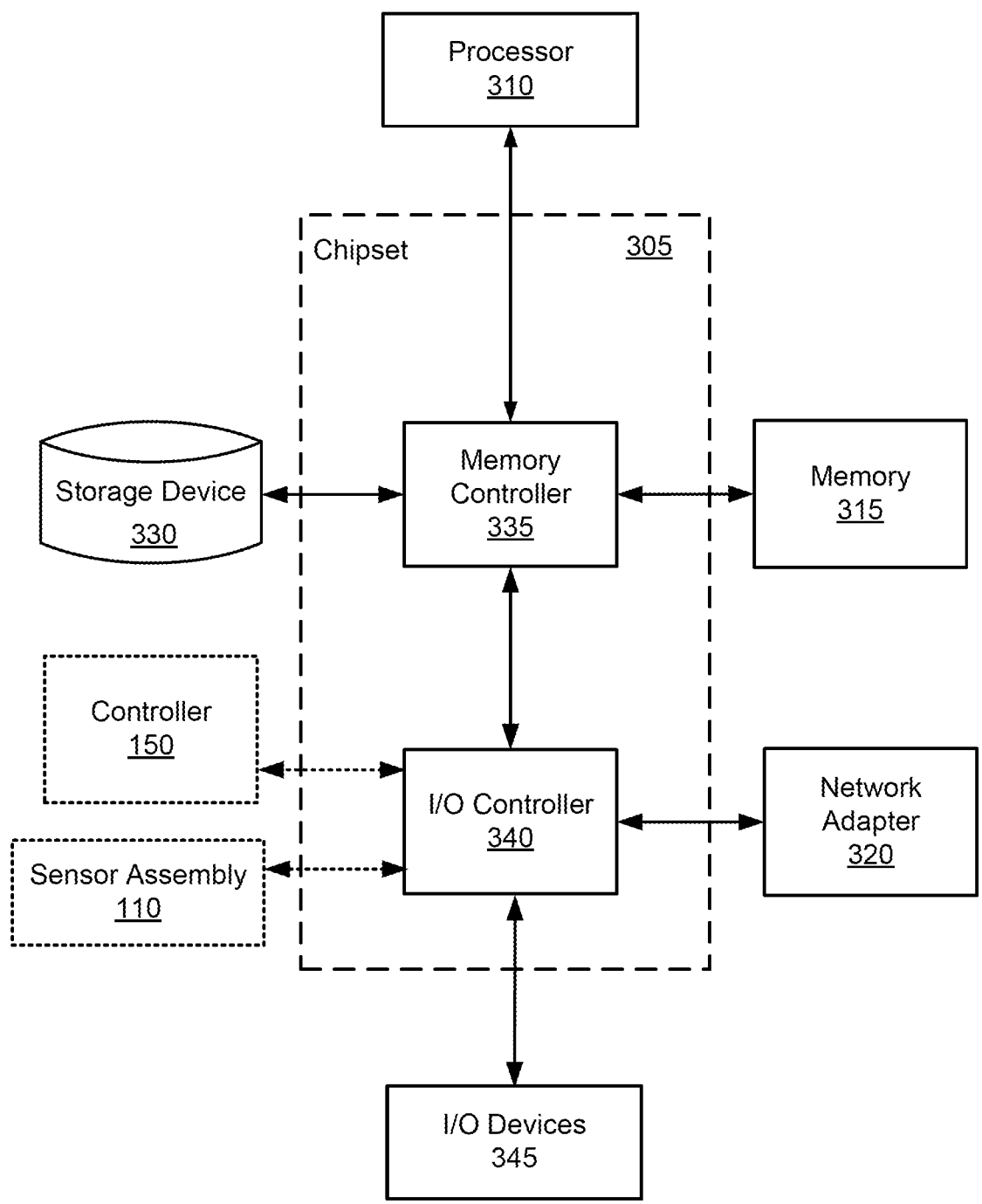
FIG. 3 is a high-level block diagram illustrating an example of a computing device used in an on-unit computer, off-unit computer, and/or database server, according to an embodiment.

FIG. 3 is a high-level block diagram illustrating physical components of an example off-unit computer 120b from FIG. 1, according to one embodiment. Illustrated is a chipset 305 coupled to at least one processor 310. Coupled to the chipset 305 is volatile memory 315, a network adapter 320, an input/output (I/O) device(s) 325, and a storage device 330 representing a non-volatile memory. In one implementation, the functionality of the chipset 305 is provided by a memory controller 335 and an I/O controller 340. In another embodiment, the memory 315 is coupled directly to the processor 310 instead of the chipset 305. In some embodiments, memory 315 includes high-speed random access memory (RAM), such as DRAM, SRAM, DDR RAM or other random access solid state memory devices.

The storage device 330 is any non-transitory computer-readable storage medium, such as a hard drive, compact disk read-only memory (CD-ROM), DVD, or a solid-state memory device. The memory 315 holds instructions and data used by the processor 310. The I/O controller 340 is coupled to receive input from the machine controller 150 and the sensor assembly 110, as described in FIG. 1, and displays data using the I/O devices 345. The I/O device 345 may be a touch input surface (capacitive or otherwise), a mouse, track ball, or other type of pointing device, a keyboard, or another form of input device. The network adapter 320 couples the off-unit computer 120b to the network 105.

As is known in the art, a computer 120 can have different and/or other components than those shown in FIG. 2. In addition, the computer 120 can lack certain illustrated components. In one embodiment, a computer 120 acting as server may lack a dedicated I/O device 345. Moreover, the storage device 330 can be local and/or remote from the computer 120 (such as embodied within a storage area network (SAN)), and, in one embodiment, the storage device 330 is not a CD-ROM device or a DVD device.

Generally, the exact physical components used in the on-unit 120a and off-unit 120b computers will vary. For example, the on-unit computer 120a will be communicatively coupled to the controller 150 and sensor assembly 110 differently than the off-unit computer 120b.

Typically the off-unit computer 120b will be a server class system that uses powerful processors, large memory, and faster network components compared to the on-unit computer 120a, however this is not necessarily the case. Such a server computer typically has large secondary storage, for example, using a RAID (redundant array of independent disks) array and/or by establishing a relationship with an independent content delivery network (CDN) contracted to store, exchange and transmit data such as the asthma notifications contemplated above. Additionally, the computing system includes an operating system, for example, a UNIX operating system, LINUX operating system, or a WINDOWS operating system. The operating system manages the hardware and software resources of the off-unit computer 120b and also provides various services, for example, process management, input/output of data, management of peripheral devices, and so on. The operating system provides various functions for managing files stored on a device, for example, creating a new file, moving or copying files, transferring files to a remote system, and so on.

As is known in the art, the computer 120 is adapted to execute computer program modules for providing functionality described herein. A module can be implemented in hardware, firmware, and/or software. In one embodiment, program modules are stored on the storage device 330, loaded into the memory 315, and executed by the processor 310.

I.F. Network

The network 105 represents the various wired and wireless communication pathways between the computers 120, the sensor assembly 110, and the excavation vehicle 115. Network 105 uses standard Internet communications technologies and/or protocols. Thus, the network 105 can include links using technologies such as Ethernet, IEEE 802.11, integrated services digital network (ISDN), asynchronous transfer mode (ATM), etc. Similarly, the networking protocols used on the network 150 can include the transmission control protocol/Internet protocol (TCP/IP), the hypertext transport protocol (HTTP), the simple mail transfer protocol (SMTP), the file transfer protocol (FTP), etc. The data exchanged over the network 105F can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

II. Digital Terrain Model Preparation

II.A. Preparation Routine

Figure 4A:
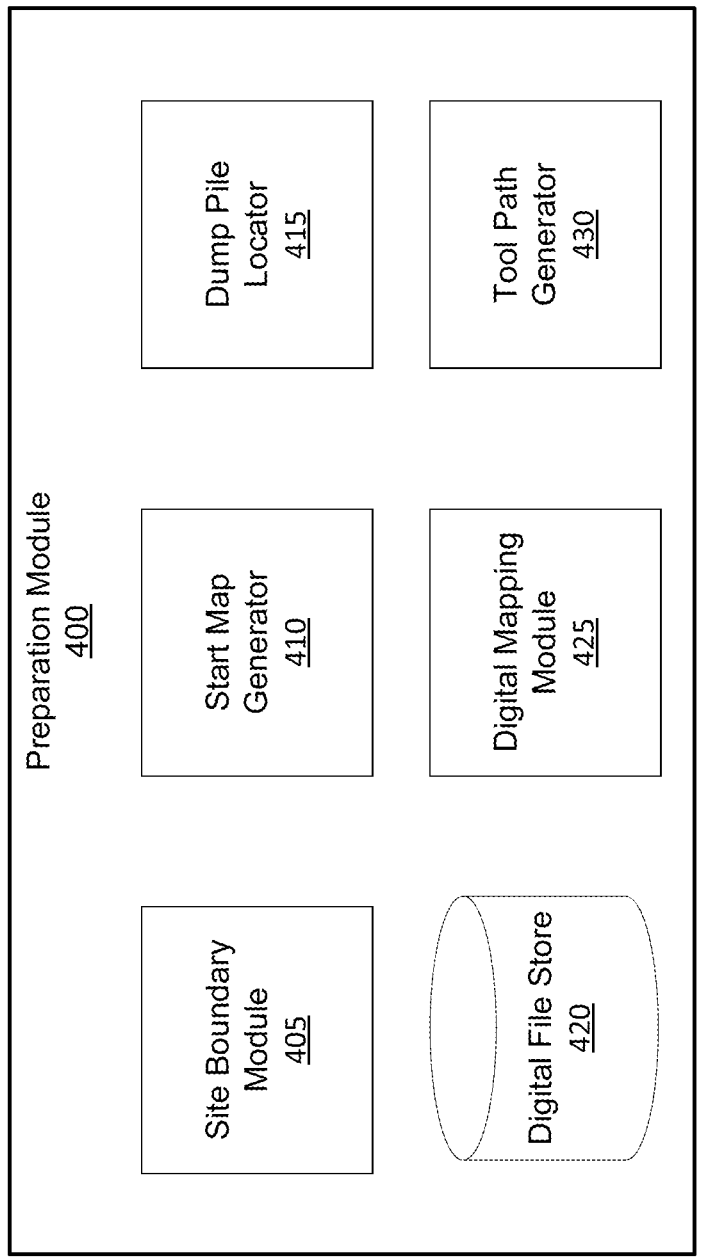
FIG. 4A is a diagram of the system architecture for the preparation module of an on-unit or off-unit computer, according to an embodiment.

FIG. 4A is a diagram of the system architecture for the preparation module 400 of an on-unit or off-unit computer 120, according to an embodiment. The preparation module 400 of an on-site or off-unit generates a digital terrain model detailing one or more plurality of actions or movements which can be followed by the excavation vehicle 115. The system architecture of the preparation module 400 comprises a site boundary module 405, a start map generator 410, a dump pile locator 415, a digital file store 420, a digital mapping module 425, and a tool path generator. In other embodiments, the preparation module 400 may include more or fewer modules. Functionality, indicated as being performed by a particular module may be performed by other modules instead.

The site boundary module 405 receives, determines, and applies one or more site boundaries representing geospatial boundaries of the perimeter of the site. In some implementations, a site boundary also includes one or more access points through which an excavation vehicle 115 may enter or exit the site before or after excavating the hole. The site boundary module 405 may present an interface (not shown) to an operator to identify the geofenced perimeter assigned to excavation vehicle 115 for the job site within which the excavation vehicle 115 may remain during subsequent processes, for example mapping, pre-dig leveling, and excavating. In one implementation, the access point defines a limit to the excavation vehicle 115 access to the job site such that the operator may account for the presence of obstacles and human operators within the site during subsequent processes.

In some implementations, the site boundary interface presents to operators a visual representation of the site. The visual representation may be generated using a manual site survey, an aerial photography system flown over the site, or a satellite image of the site. The site boundary interface may prompt operators to define the site boundary based on the locations of vertices of the boundary. The site boundary interface may similarly prompt operators to define a boundary of the hole using vertices of the hole boundary. Using the site boundary interface, the operator may define the site boundaries prior to the arrival of the excavation vehicle 115 on the job site.

An operator refers to a human technician or user responsible for setting up, overseeing, and maintaining the operation of the excavation vehicle 115 within the site. In one implementation, the operator manually navigates the excavation vehicle 115, by remote control of direct control over the vehicle, along the site boundaries while one or more position sensors 145 record location information associated with the site boundaries. Using the recorded location information, the site boundary module 405 generates a representation of the site boundaries within the coordinate space. Manual navigation of the excavation vehicle 115 may be performed via remote control or direct control over the vehicle. Remote control of the vehicle may be performed using a handheld controller, for example, (e.g., a tablet computer or smartphone) communicatively coupled to a mobile computing device (e.g., a laptop computer) capable of wirelessly communicating control signals to the excavation vehicle 115. In alternate implementations, the computer 120 implements a different set of methods or techniques to retrieve or to interface with an operator to define a site boundary.

The start map generator 410 generates, in real-time, a representation of the initial ground surface within the site boundary prior to any excavation routine. The excavation vehicle 115 may be deployed to navigate over the ground surface within the site boundaries to map the job site using a combination of spatial sensors 130, imaging sensors 135, and position sensors 140. Information recorded by the imaging sensors 135, the position sensors 140, and the spatial sensors 130 is received by the start map generator 410 and processed to generate an accurate start map. Information recorded by imaging sensors 135 identifies features within the site boundaries, while information recorded by position sensors 140 identifies the locations of those features within the site boundaries. Features of the ground surface refer to variations from a threshold height of the ground surface, for example mounds of earth extending above the ground surface of sinks extending below the ground surface. Spatial sensors 130 provide depth or height measurements for each feature to generate a three-dimensional start map. While navigating within the site boundaries, the excavation vehicle 115 may sample the spatial sensors 130 to record depth images representing distances between the excavation vehicle 115 and one or more surfaces within the site.

Simultaneously, the excavation vehicle 115 may also periodically read geospatial location and orientation information recorded by the position sensors 140, for example latitude, longitude, altitude, pitch, yaw, and roll of a reference point. Examples of spatial sensors include, but are not limited to, compass sensors, multi-axis gyroscopes, and multi-axis accelerometers integrated into the excavation vehicle 115. In some implementations, position sensors 130 communicate with a reference sensor placed within or in proximity to the site, for example mounted to a stake positioned within the ground, enabling the position sensors to reduce error in calculations of the actual location of features and the excavation vehicle 115 within the site. The start map generator 410 may relate geospatial location and orientation data recorded by the position sensors 130 with the spatial information recorded by spatial sensors 130 and the known extrinsic parameters for the spatial sensors (e.g., an angle from each sensor mounted to the EV to a reference point within the site) to generated a three-dimensional start map representing a real-time 3D profile of the ground surface within the site boundaries. In alternate implementations, the data recorded by the spatial sensors 130, the image sensors 135, and the position sensors 140 may be transmitted to the off-unit computer 120b such that the generation of the 3D start map may occur a later time. In such an implementation, prior to excavating the hole, the excavation vehicle 115 accesses the 3D start map from the computer memory.

Based on the 3D start map describing initial features within the, the dump pile locator 415 selects a location of a dump pile within the site and updates the 3D start map based on that position. While excavating the hole, the excavation vehicle 115 moves earth from the excavated hole to the dump pile. In one implementation, to reduce a total volume of earth moved by the excavation vehicle 115 during a pre-excavation leveling routine (described in further detail below in Section III and IV), the dump pile locator 415 may position the dump pile over the deepest sink within the site. During excavation, the excavation vehicle 115 deposits excavated earth from the excavated hole at the dump pile, filling the sink to level it with the ground surface, rather than moving earth prior to the excavation to level the sink. Additionally, the dump pile locator 415 may position the dump pile a sufficient distance from the hole to limit the risk of the dump pile falling back into the hole. A sufficient distance may be determined based on a static preset distance from the excavation cavity or an offset from the excavation cavity proportional to the volume of the excavation cavity. The dump pile locator 415 may also account for additional features within the site and position the dump pile at a sufficient distance from other features within the site.

In implementations in which multiple features are eligible for the location of the dump pile, the dump pile locator 415 calculates a length of time for the excavation vehicle 115 to travel from the hole to each feature and selects the feature with the shortest travel time. The length of time for the excavation vehicle 115 to travel from the hole to a feature may also include the amount of time for the excavation vehicle 115 to release earth onto the dump pile and return to the hole to continue excavating.

Additionally, the dump pile locator 415 may account for the estimated maximum size of the dump pile, the estimated compaction factor of the excavated earth, and the estimated swell factor of the excavated earth when selecting a position of the dump pile 515.

In some implementations, after selecting a location of the dump pile, the dump pile locators 415 presents a confirmation interface to the operator to confirm the location. The confirmation interface may present the 3D start map including the proposed location of the dump pile for manual confirmation by the user. Should the operator decide to reposition the location of the dump pile (e.g., if the proposed location covers a drain field for an on-site septic system), the operator may reject the proposed location, prompting the dump pile location 515 to select an alternative location and update the interface accordingly. To select an alternative dump pile location, the dump pile locator 415 implements steps similar to those described above without considering the previously proposed location. Alternatively, an operator may interact with the interface to manually select an alternative location for the dump pile by highlighting features or locations in the 3D start map.

In another implementation, the dump pile locator 415 may position the dump pile such that the excavation vehicle 115 follows a linear path from the hole to the dump pile while avoiding obstacles or features within the site boundaries. Obstacles are further described below in Section III.B.

The digital file store 420 maintains one or more digital files, accessed from a remote database. Digital files may be represented as image files describing the geographic layout of the site as a function of location within the coordinate space of the site, with different images representing a hole, dump pile, an entry ramp, etc. Geographic locations in the coordinate space may be represented as one or more two or three dimensional points. The digital file may also include data describing how the excavation vehicle 115 ought to interact with each location discussed in the digital file. The digital files stored in the digital file store 420 may also include a digital file representing a target state of the site once all excavation has been completed. Digital files may be constructed using known computer programs and file types, such as a Computer Aided Design (CAD) file or a Building Information Modeling (BIM) file.

For example, the hole may be characterized by a set of target volume dimensions which should be achieved upon the conclusion of the excavation routine. At a boundary of the hole, the digital file may also include a ramp. Geometrically, the width of the ramp is generally greater than the maximum width of the combination of the excavation vehicle 115 and the tool.

When appropriate, the digital file may also describe the location of fiducials representing technical pieces of equipment previously placed at the site such as stakes with active emitters and grade stakes. In alternate instances, the locations of the fiducials may be manually input to a computer 120 based on the records of a human operator.

The digital mapping module 425 generates digital terrain models based on a comparison between the representation of the target state of the site, accessed from the digital file store 420, and the representation of the initial state of the site, generated by the start map generator 410. By aligning in the coordinate space of the site, the digital file, representing the target state of the site, with the 3D start map, representing the initial state of the site, differences between the two representations can be identified by the computer 120. For example, the computer 120 may determine a volume of earth to be excavated to form the planned hole from the digital file. In one embodiment, the two representations (the digital file and the contextual data) are aligned (or register) using the known locations of fiducials and other locations within the site common to both representations. Position data from a position sensor 145 such as a GPS may also be used to perform the alignment. Algorithms, such as Iterative Closest Point (ICP) may be used to align the two representations. The boundaries of the sites provided by both representations may also be used to perform the alignment. In one embodiment, for every point pair in the actual/target representations, if the difference in elevation (e.g., Z-axis relative to the ground plane) is greater than a threshold, it is multiplied by the resolution of the representation to calculate a voxel volume, and is then summed together. This alignment can be performed at multiple points to determine how the two representations should be adjusted relative to each other along an axis to align them.

In one implementation, the digital mapping module 425 is generated by aligning the 3D start map of the site with the digital file of the planned excavation for the site. By receiving location information from a static geospatial reference sensor positioned at a corner of the site, the digital terrain model assigns a reference marker to the corresponding location on the coordinate spaces of both the 3D start map and the digital file, aligns the vertical axis of both coordinate spaces, and sets a yaw angle of the virtual 3D excavation cavity based on a compass orientation of the excavation cavity extracted from the cut/fill diagram. The digital mapping module 425 may adjust the altitude of the reference marker within the start map to align a peak of the hole defined by the digital file to a peak of the initial state of the site described by the 3D start map or based on an altitude of the hole specified in the digital file, The digital terrain model also includes nuanced considerations for the excavation of the planned hole such as implementing one or more cutbacks and slope backs, as described in the received digital file. Cutbacks describe the raised surfaces within the planned hole and slope backs describe the sloped incline of the boundaries of the planned hole. The implemented tool paths incorporate the creation of the one or more cutbacks and slope backs within the planned hole. Further, to generate the cutbacks, the tool may collect a volume of earth and use one or more sensors to obtain a soil cohesion measurement based on the collected volume of earth. Based on various soil properties, described in further detail below, the computers 120 may access a soil cohesion measurement from a remote server. Based on the received soil cohesion measurements, the computers 120 generate one or more geometric parameters describing the cutback and incorporate those parameters into the digital terrain model. The digital mapping module 425 may also receive information describing the potential locations for any human operators within the hole and adjusts the geometric parameters for the cutback based on these locations. For example, if human operators will not be entering the hole, the cutback angle at that edge is smaller compared to if a human is planning on entering the hole. Additionally, the digital mapping module 425 receives an estimate of the length of time for the site to be excavated and, to prevent cave-ins, updates the instructions for the cutback accordingly.

Using the digital terrain model, the tool path generator 430 generates one or more tool paths for the excavation vehicle 115 to move a tool over in order to excavate the volume of earth as part of the excavation routine, remove obstacles obstructed the navigation of the excavation vehicle 115, or to release contents onto a dump pile. Generally, a tool path provides geographical steps and corresponding coordinates for the excavation vehicle 115 and/or excavation tool to traverse within the site 505, for example an avoidance sub-route. In addition, tool paths describe actions performed by the excavation tool mounted to the excavation vehicle 115, for example adjustments in the position of the tool at different heights above the ground surface and depths below the ground surface. When the site 505 is represented in the digital terrain model as a coordinate space, as described above, a tool path includes a set of coordinates within the coordinate space. When a set of instructions call for the excavation vehicle 115 to adjust the tool mounted to the excavation vehicle 115 to excavate earth, dump earth, break down an obstacle, or execute another task the tool path also includes a set of coordinates describing the height, position, and orientation of the tool within the coordinate space of the site 505. When describing the excavation of a hole, a tool path further represents a measure of volume relative to the volume of the planned hole. For example, if a hole is 4" wide, 3" long, and 2" deep, a single tool path includes coordinates within the 12" area of the coordinate space and, at each coordinate, places the tool at a depth of 2" in order to excavate the hole using a single tool path. Tool paths may describe a variety of shapes representing a variety of excavation techniques, for example substantially rectangular pathways in two dimensions, substantially triangular pathways in two dimensions, hyperrectangular pathways in three dimensions, hyperrectangular pathways in three dimensions, elliptic pathways in two dimensions, hyperelliptic pathways in three dimensions, or curved lines along the plane of the ground surface.

Some tool paths achieve goals other than digging. For example, the last tool path used at the conclusion of the excavation of the hole may be referred to as a finish tool path, which digs minimal to no volume and which is used merely to even the surface of the bottom of the dug hole. While moving through the finish tool path, the tool excavates less earth from the hole than in previous tool paths by adjusting the depth of the leading edge or the angle of the tool beneath the ground surface. To conclude the digging routine, the excavation vehicle 115 adjusts a non-leading edge of the tool and reduces the speed of the drive.

For holes of greater volumes or requiring a graded excavation, multiple tool paths may be implemented at different offsets from the finish tool path. For example, if three tool paths are required to excavate a 6" deep hole, the first may be executed at a depth of 3", the second at a depth 2", and the third at a depth of 1". As a result, a tool path may represent only a fraction of the volume of excavated earth. In one embodiment, the number of tool paths may be calculated by dividing the target depth of the hole by the maximum depth that each tool path is capable of. In some instances, the maximum depth that each tool path is capable of is also defined by the dimensions of the tool 175 attached to the excavation vehicle 115. In other embodiments, the tool paths may be manually generated using the off-unit computer 120b.

Additionally, tool paths may not describe the shape of the hole in three-dimensions, instead removing the depth measurement to only specify a two-dimensional pathway or two-dimensional plane in the three or two dimensional coordinate system. In such instances, the depth instructions for how deep to dig with a tool path may be provided for separately in the set of instructions.

Tool paths are defined based on several factors including, but not limited to, the composition of the soil, the properties of the tool being used to excavate the hole, the properties of the drive system 210 moving the tool, and the properties of the excavation vehicle 115. Example properties of the excavation tool 175 and excavation vehicle 115 include the size of the tool, the weight of the excavation tool, and the force exerted on the excavation tool 175 in contact with the ground surface of the site.

II.B. Example Process Flow

Figure 4B:
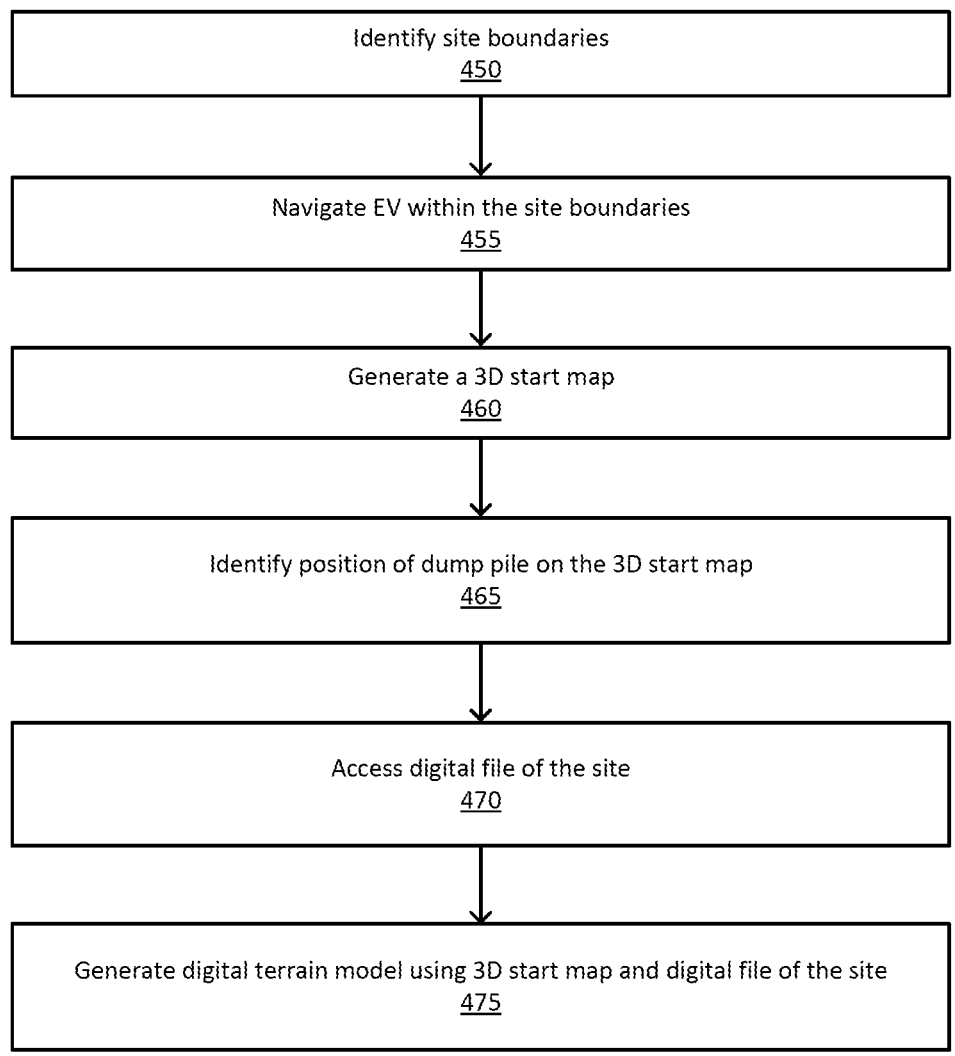
FIG. 4B shows an example flowchart describing the process for the preparation module to prepare a digital terrain model of the site, according to an embodiment.

To implement the system architecture of the preparation module 400, FIG. 4B shows an example flowchart describing the process for preparation module 400 to prepare a digital terrain model of the site, according to an embodiment. As described above, the excavation vehicle 115 navigates over the perimeter of the site to identify 450 site boundaries using information recorded by one or more position sensors 145. The site boundary module 405 receives data from the position sensors 145 and processes that data to generate a geospatial perimeter representing the boundaries of the site. In some implementations, site boundaries are manually identified by an operator through an interface presented by the site boundary module 405.

After identifying the boundaries of the site, the excavation vehicle 115 navigates 455 within the site to record contextual data describing the site, for example holes in the ground surface, existing mounds of earth, or obstacles throughout the surface. Using a combination of position sensors 145, imaging sensors 140, and spatial sensors 135, the start map generator 410 generates 460 a visual representation of the initial state of the physical landscape of the site and features within the site. When recording data via one or more spatial sensors, the spatial sensors 130 record one or more photographic images of various portions of the site and stitches the recorded images into one or more point clouds of data representing the portions of the site to generate a representation of a current physical state of the site. Additionally, for each of the recorded images, the position and orientation of features within the site are recorded and translated into the point cloud representations with respect to the coordinate space of the digital file. In alternative instances, the sensor assembly 110 uses an imaging sensor 135 to record the contextual information as photographic images of portions of the site and, for each of those images, stores the associated positions and orientations of the relevant features within the portion of the site. In another implementation, the excavation vehicle 115 includes sensors and a software assembly that generates a digital terrain model of the site using simultaneous localization and mapping (SLAM).

The dump pile locator 415 identifies 465 a position of the dump pile and updates the 3D start map accordingly. The dump pile locator 415 accounts for a variety of contextual factors including travel times between the hole and each potential location of the dump pile, differences in depths of features beneath the ground surface of the site, the amount of earth to be excavated, and various earth properties as described above.

From the digital file store 420, the preparation module 400 accesses 470 a digital file describing instructions or parameters to excavate the hole beneath the ground surface. The digital file details a planned excavation of the hole and area surrounding the hole, including a set of geometric measurements describing the hole. Using the generated representation of a current physical state of the site, generated by the 3D start map generator 410, and the target state of the site, accessed from the digital file store 420, the digital mapping module 425 generates 475 a digital terrain model of the site by aligning the two representations by common features such as physical fiducials within the sites or the boundaries of the site.

Figure 5:
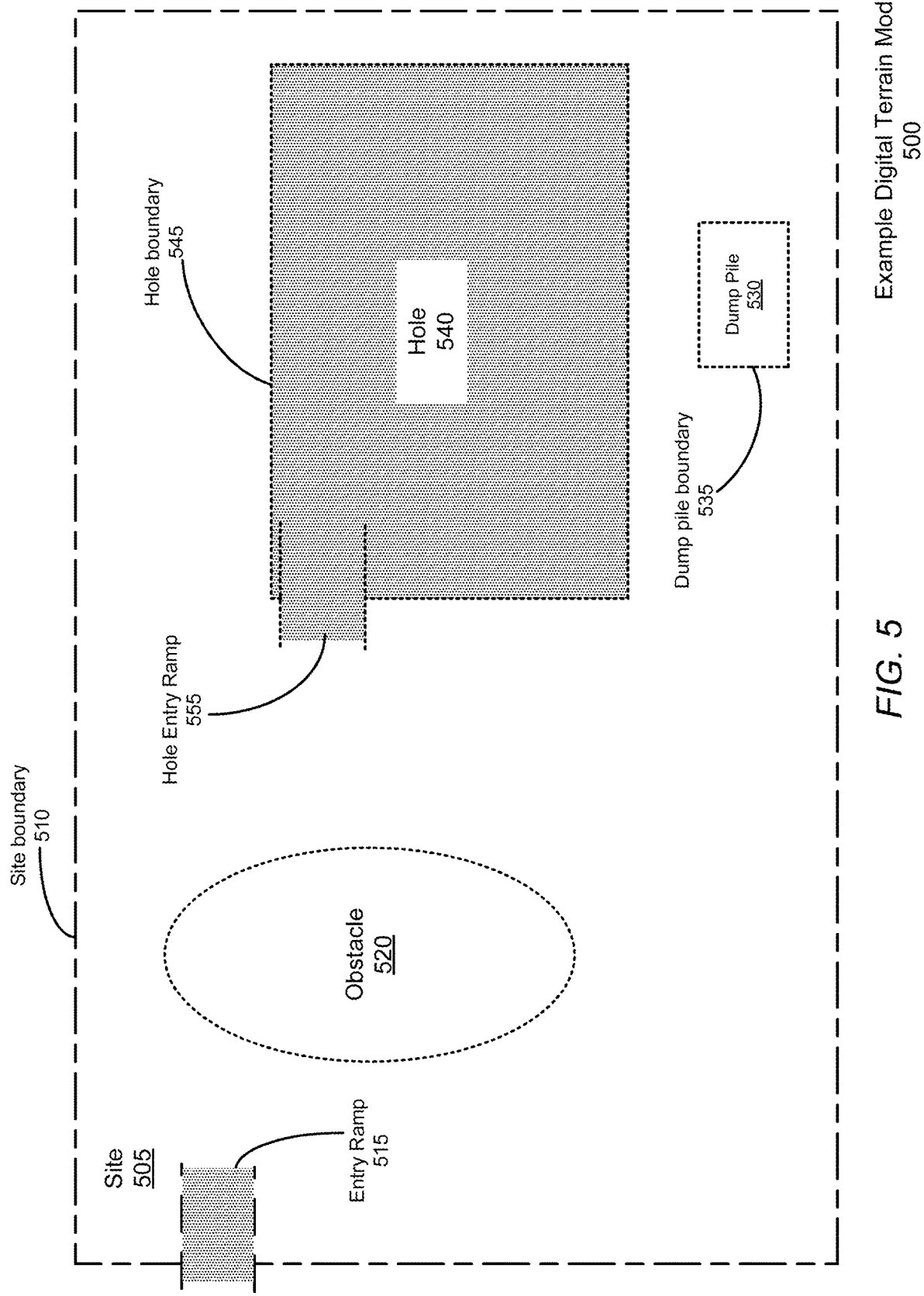
FIG. 5 illustrates an exemplary digital terrain model generated by the digital mapping module, according to an embodiment

FIG. 5 illustrates an exemplary digital terrain model generated by the digital mapping module 425, according to an embodiment. As illustrated in FIG. 5, the digital terrain model graphically resembles the 3D start map overlaid with the features of the digital file. For illustrative purposes, of the digital file are illustrated using a darker shading than those of the 3D start map. The model of the site 505 includes a site boundary 510 defining the perimeters of the site and an entry ramp 550 for the excavation vehicle 115 to enter the site 505 based on the sensor data gather during the generation of the 3D start map. Additionally, sensor data taken within the site 505 identifies any obstacles 520 located within the site. Based on the location of obstacles 520 and responsive to user input, the 3D start map presents a location for the dump pile 530 by outlining the dump pile boundary 535. As described above, the dump pile 530 refers to a location within the site 505 where the excavation vehicle 115 releases excavated earth held in a tool attached to the excavation vehicle 115. As described herein, earth refers to the ground material and composition of a site, for example soil, dirt, and gravel. As illustrated, the dump pile 530 is positioned a sufficient distance away from the obstacle 520 to reduce risk of the excavation vehicle 115 being caught in an obstacle while navigating to the dump pile 530. The digital file, accessed from the digital file store 420, describes the location of the hole 540, defined by the hole boundary 545. Overlapping the hole boundary 545, the digital file identifies a hole entry ramp 555 for the excavation vehicle 115 to enter the hole 540 and an entry ramp 515 to enter the site 505. Ramps refer to graded pathways over which the excavation vehicle 115 may traverse to enter/exit different locations within the site.

II.C. Excavation Vehicle Tracking

As the excavation vehicle 115 navigates within the site 505, the position and orientation of the vehicle and tool is dynamically updated within the coordinate space representation maintained by the computer 120. Using the information continuously recorded by the sensors 170, the computer 120 is able to record the progress of the excavation tool path or route being following by the excavation vehicle in real-time, while also updating the instructions to be executed by the controller.

To determine the position of tool within the three-dimensional coordinate space, the computer 120 may use the sensors 170 to correlate changes in the information recorded by the sensors with the position of the tool in the coordinate space by referencing a parametric model or lookup table. Lookup tables are generated by measuring the output of sensors at various positions of the tool and correlating the outputs of the sensors with the positions of the tool. For example, at a depth of 1 meter, the tool is located at a position 5 meters perpendicular to the ground. The correlation between the depth measurement recorded by the spatial sensor 130 and the position measurement recorded by the position sensor 145 is stored within the lookup table. The referenced lookup table may differ depending on the type of sensor used and the format of the output provided.

In one implementation, the absolute position of the excavation vehicle 115 within the coordinate space is measured using one or more global positioning sensors mounted on the tool. To determine the position of the tool in a three-dimensional coordinate space relative to the excavation vehicle, the computer 120 accesses additional information recorded by the sensors 170. In addition to the absolute position of the excavation vehicle 115 measured using the global positioning sensor, the computer 120 performs a forward kinematic analysis on the tool and maneuvering unit of the excavation vehicle 115 to measure the height of the tool relative to the ground surface. Further, one or more additional position sensors mounted on tool measure the orientation of a leading edge of the tool relative to the ground surface. The leading edge describes the edge of the tool that makes contact with the ground surface. The computer 120 accesses a lookup table and uses the absolute position of the excavation vehicle 115, the height of the tool, and the orientation of the leading edge of the tool as inputs to determine the position of the tool relative to the excavation vehicle 115.

II.D. Excavation Tool Paths

As described above the excavation tool path 670 describes instructions for the excavation vehicle 115 to excavate a volume of earth consistent with the planned hole described in the digital file by navigating the excavation vehicle 115 within the hole and adjusting beneath tool mounted to the EV to move earth from the hole 540. As described earlier, excavation describes the movement of earth by the excavation vehicle 115 within the site. Excavation tool paths 670 may occur inside or outside the hole depending on the context and function for which the excavation tool path 670 is implemented. When navigating over the excavation tool path 670, the excavation vehicle 115 may continuously or periodically track the position of the tool within the coordinate space using information obtained from the position sensor 145.

In addition to defining the height at which the leading edge is lowered beneath the ground surface, the excavation tool path 670 may also instruct the controller 150 how far to move the tool within the hole without raising the tool above the ground surface. In order to maintain the movement of the tool beneath the ground surface, the excavation tool path 670 instructs the controller 150 to dynamically adjust mechanical conditions of the excavation vehicle 115 including, but not limited to, the angle of the tool beneath the ground surface, the torque output of the engine system, and the true speed of the tool. The angle of the tool beneath the ground surface can be adjusted to reduce the rate at which the tool collects excavated earth. For example, when the tool is angled perpendicular to the flat ground surface, the rate of excavation may be at its highest. Alternatively, when the tool is angled parallel to the flat ground surface, the rate of excavation may be at its lowest. Additionally, at lower speeds, the tool is generally often better able to maintain the angle optimal for excavating earth.

While excavating the hole 540, the excavation vehicle 115 periodically travels between the hole 540 and the dump pile 530 by executing long, linear paths. In some implementations, the excavation vehicle may also laterally offset paths between consecutive excavation tool paths and dumps at the dump pile 530 to prevent or reduce a magnitude of runs formed on the job site during the dig routine. For example, the controller 150 laterally offsets consecutive excavation tool paths/dump tool paths 670 by adjusting the height of the tool at a static, preset offset distance, such as half the width of one track for the excavation vehicle 115 that runs on two driven tracks. In another example, the controller 150 laterally offsets the tool at consecutive excavation tool paths 670 by an offset distance proportional to a wetness or viscosity of top soil at the job site, such as up to 90% of the track width of the excavation vehicle 115 or not less than 100% of the track width of the excavation vehicle 115. Therefore, by adjusting the height of the tool to laterally offset consecutive excavation tool paths 670 between the hole 540 and the dump pile 530, the controller 150 may limit a total number of instances in which the excavation vehicle 115 traverses the same path between the hole 540 and the dump pile 530 during the excavation tool path 670, while also limiting a total distance covered by the excavation vehicle 115 during the excavation tool path 670 and thus limiting a total duration of the excavation tool path 670.

III. Obstacle Handling and Route Planning

III.A. Route Overview

While navigating within the site 505 or the hole 540, the excavation vehicle 115 may encounter one or more obstacles through which it cannot pass. To move past an obstacle, the excavation vehicle may either travel around the obstacle or execute a set of instructions to remove the obstacle before traveling through it. Depending on the type of obstacle detected, the excavation vehicle may redistribute earth from various locations in the site to level, fill, or modify obstacles throughout the site. In some implementations, the excavation vehicle 115 moves the physical obstacle, for example a shrub, to a location away from the path of the vehicle. Obstacles may be obstruct the movement of the excavation vehicle 115 around the site 505 and within the hole 540 during an excavation tool path. Accordingly, the excavation vehicle 115 generates routes for traveling between locations of the site based on the locations of obstacles, the hole 540, and the dump pile 530. More specifically, prior to moving between two locations within the site, the excavation vehicle 115 uses information gathered by the sensors 135 and presented in digital terrain models to determine the most efficient route between the two locations in the site. By generating these routes prior to navigating within the site, the excavation vehicle is able to more efficiently navigate within the site and execute excavation tool paths within the site 540.

Figure 6:
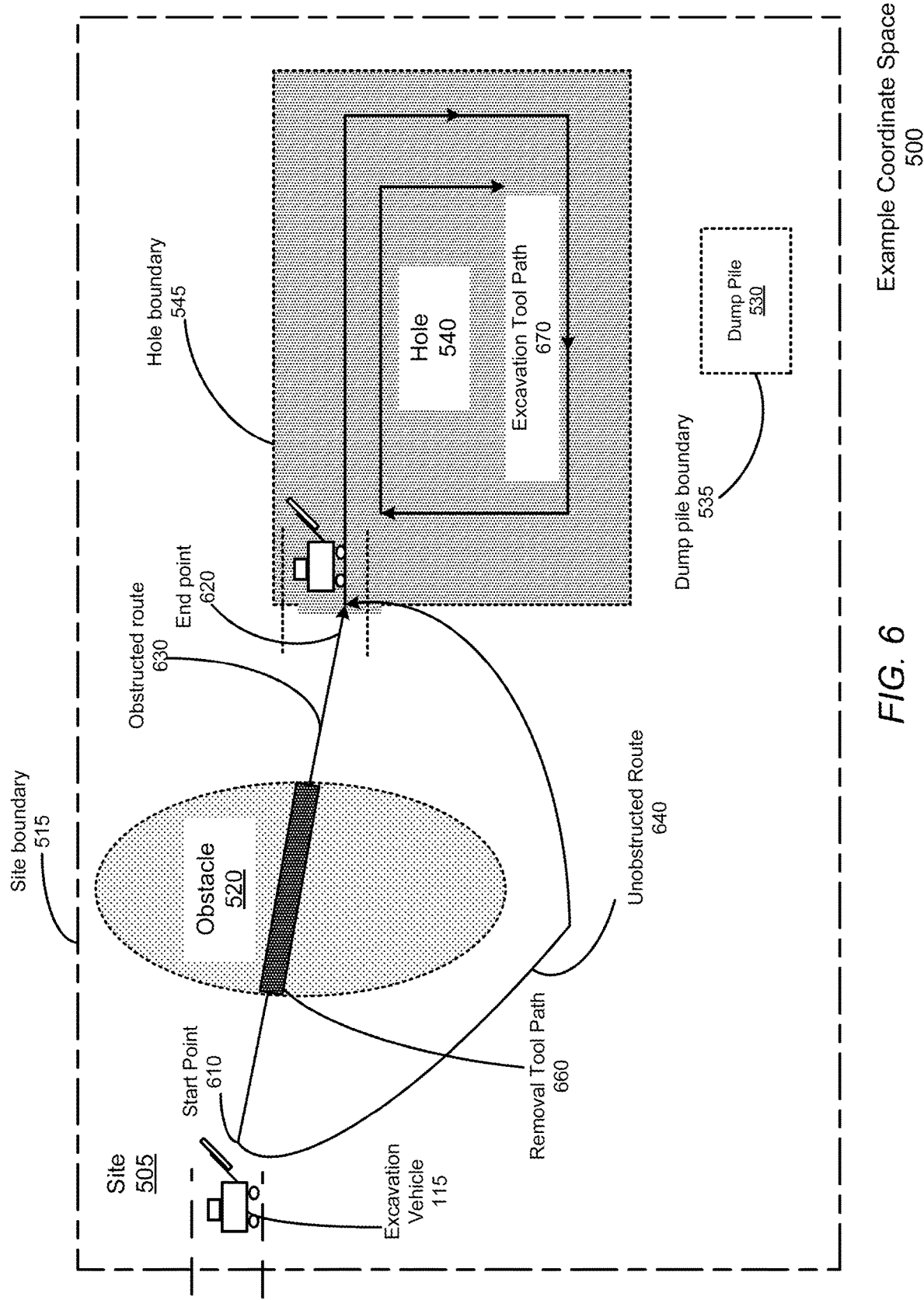
FIG. 6 illustrates an example coordinate space in which an excavation vehicle navigates within a dig site, according to an embodiment.

FIG. 6 illustrates an example coordinate space 500, based on the exemplary digital terrain model of FIG. 5, in which an excavation vehicle 115 navigates within a dig site 505, according to an embodiment. FIG. 6 may be a visual representation of the coordinate space from a digital file detailing the navigation of the excavation vehicle 115 within the dig site. In this example, the excavation vehicle 115 may navigate over one of two routes: an obstructed route 630 obstructed by an obstacle 520 and an unobstructed route 640. An obstacle 520 describes a structure or material within the site 505 which would hinder the navigation of the excavation vehicle 115. As a result of the presence of the obstacle, the excavation vehicle 115 is traditionally forced to navigate around an obstacle 520. This description provides a technique for determining whether it would be more cost efficient to instead use the attached tool to remove the obstacle from the navigation path rather than suffer the time penalty, fuel penalty, damage to the excavation vehicle, any unnecessary noise, or any risk averse areas while driving around it for each pass in the process of accomplishing a task.

Walking through an example hypothetical navigation routine for the purpose of discussing the concepts introduced in FIG. 6, in one such routine the excavation vehicle 115 enters the site 505 at a starting point 610. At the starting point 610, the excavation vehicle 115 identifies an end point 620 of the excavation vehicle 115 navigation. In some implementations, the end point 620 is located at the hole boundary 545. Upon reaching the end point 620, the EV may begin excavating the hole 540. To navigate from the start point 610 to the end point 620, the excavation vehicle 115 detects any obstacles 520 located between the start point 610 and the end point 620.

Having analyzed the obstacles 520, the computer 120 generates an unobstructed route 640 and at least one obstructed route 630. An obstructed route 630 travels from the start point 610, through at least one of the detected obstacles, to the end point 620, assuming the obstacle has been removed. As will be discussed further below, this may be accomplished by carrying out a set of removal tool paths 660 which provides a set of controlled motions to the tool mounted to the EV in order to remove the obstacle 520. By contrast, an unobstructed route 640 circumvents all detected obstacles 520 such that the excavation vehicle 115 may navigate from the start point 610 to the end point 620 without having to take the additional resource costs to carry out the removal tool paths 660. Often, the obstructed route will be shorter in distance than the unobstructed route, as often it is only advantageous to take the additional resource costs to remove the obstacle if it creates some tangible benefit to the operator, such as a reduced total task time or more efficient use of fuel.

The computer 120 further determines which route is preferable. This may either be in terms of time efficiency or in terms of some other benefit such as device wear and tear, tool efficiency in carrying out a task, etc. Having determined which route to take, the computer 120 instructs the excavation vehicle 115 to navigate over the route, between the obstructed route 630 and the unobstructed route 640, to the end point 620 where the vehicle 115 enters the hole 540. After entering, the excavation vehicle 115 executes a set of excavation tool paths 670 to move earth between the hole 540 and the dump pile 530. Further details regarding the generation of obstructed routes 630, unobstructed routes 640, and removal tool paths 660, and determination of which route to take are described below in reference to FIG. 7A-B.

III.B. Obstacle Detection and Evaluation

Figure 7A:
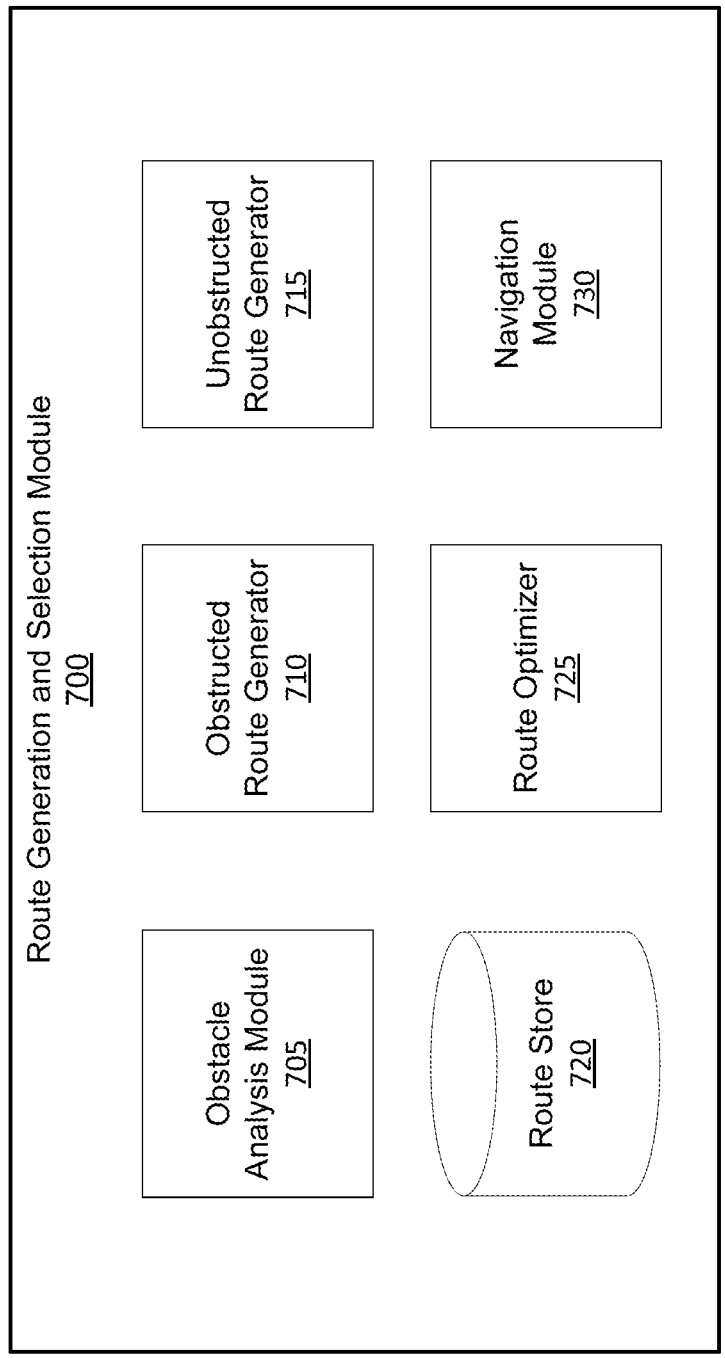
FIG. 7A is a diagram of the system architecture for the route generation module of the excavation vehicle, according to an embodiment.

FIG. 7A is a diagram of the system architecture for the route generation and selection module 700 of an excavation vehicle 115, according to an embodiment. The route generator module 700 executes a set of instructions for generating the most efficient route between two locations within the site 505 and representing the route within the coordinate space of the site 505. The instructions cause the controller 150 to control the drive system of the excavation vehicle 115 to navigate over the generated route between a start point 610 and an end point 620. The system architecture of the route generation and selection module 700 comprises an obstacle analysis module 705, obstructed route generator 710, unobstructed route generator 715, route store 720, route optimizer 725, and navigation module 730. In other embodiments, the route generation and selection module 700 may include more or fewer modules. Functionality indicated as being performed by a particular module may be performed by other modules instead.

From the images used to generate the 3D start map, the obstacle analysis module 705 detects features in the ground surface of the site 505, for example mounds of earth, sinks, divots, or holes in the earth that may obstruct the earth-moving vehicle's motion while navigating between an entry point on the site boundary 515 to the hole 520 and between the hole 520 and the dump pile 530. The obstacle analysis module 705 may analyze the 3D start map to detect more severe features in the ground surface of the site 505 and flag these variations as potential obstacles 520. In some implementations, the obstacle analysis module 705 may detect and flag such severe features of the site 505 in real-time during the generation of the 3D start map. Potential obstacles 520 may be detected within the section of the site 505 represented by the hole 504 and within sections of the site 505 outside of the hole 520. Obstacles 520 may be categorized as modifiable obstacles or immutable obstacles depending on the structural properties or protocols executed to remove the obstacle. In implementations in which the imaging sensors 135 are RGB cameras, the obstacle analysis module performs a computer vision-based object classification module using traditional computer vision techniques or a previously trained neural network.

Modifiable obstacles refer to features of the obstacle, for example mounds of the earth above the ground surface or sinks of earth beneath the ground surface as described above in reference to the start map generator 410. Additionally, modifiable obstacles may refer to a plurality of mounds of earth (i.e., a road with several bumps), a wall, a body of water (i.e., a stream or pond), an area of wet earth (i.e., mud), a cliff, or shrubbery.

To identify modifiable obstacles 20, the obstacle analysis module 705 determines a threshold height and threshold slope of the ground surface based on the data recorded by the sensors 170, the 3D start map, or a combination of both. In some implementations, the obstacle analysis module 705 applies a low-pass filter to the start map to filter out insignificant variations in the ground surface of the site 505. In other implementations, from the 3D start map, the obstacle analysis module 705 generates a representation of the site 505 including longitudinal and lateral surface profile lines using one or more reference points indicating the threshold height and threshold slope of the ground surface. Using the surface profile lines, the obstacle analysis module 705 calculates deviations in the height and slope of each feature from the ground surface. For example, the obstacle analysis module 705 detects a region of the ground surface exhibiting a slope greater than 500% above the threshold slope of the ground surface, extending upward at a height more than 200 millimeters above the threshold height of the ground surface, and more than 50 millimeters wide and flags the region as including a potential obstacle, for example a mound of earth. Similarly, the obstacle analysis module 705 may detect a region within exhibiting a slope greater than 10% below the threshold slope of the ground surface and extending more than 200 millimeters below the threshold height of the ground surface as including a sink. Modifiable obstacles, for example obstacle 520 as shown in FIG. 6, can be removed from the site 505 through one or more removal tool paths 660 which may be executed by the excavation vehicle 115.

The obstacle analysis module 705 also detects immutable obstacles, including but not limited to, trees, poles, pylons, rocks, roots, wooden beams, fire hydrants, curbs, and pieces of concrete, asphalt, and steel. The obstacle analysis module 705 implements similar techniques as those described above to detect immutable obstacles based on structural properties of each obstacle. Structural properties include, but are not limited to, the volume of the obstacle 520 above the ground surface, the geometry of an obstacle 520 at an elevation above the ground surface, the geometry of an obstacle 520 below the ground surface, the volume of an obstacle 520 below the ground surface, and a number of tool paths 660 executed to remove the obstacle 520 based on the tool used by the excavation vehicle 115 to remove the obstacle. For example, the excavation vehicle 115 detects a region of the ground plane exhibiting a slope between 10% and 500% above the threshold slope of the ground surface and extending upward at a height more than 200 millimeters above the threshold height of the ground surface and flags the region of the site 505 as including a potential obstacle.

Unlike modifiable obstacles 520, immutable obstacles cannot be removed by the excavation vehicle 115 and, as a result, both the unobstructed route 640 and the obstructed route 630 circumvent any detected immutable obstacles using an avoidance sub-route. Avoidance sub-routes describe a set of coordinates within the coordinate space of the site 505 to be included in both the obstructed route 630 and unobstructed route 640 such that the excavation vehicle 115 does make contact with the immutable obstacle. For example, when implemented by the obstacle analysis module 705, an avoidance sub-route provides a path for the excavation vehicle 115 to traverse around the obstacle, for example a linear segment, an arcuate segment of radius greater than a minimum radius (e.g., to reduce local disruption of the ground place by tracks on the autonomous excavation vehicle 115) followed by another linear segment. To generate an avoidance sub-route, the obstacle analysis module 705 calculates a width of the obstacle in order to characterize the region of the site 505 to be circumvented by the excavation vehicle 115. Continuing from the above example, the obstacle analysis module 705 may classify an obstacle with a width 500 millimeters greater than a threshold width as an immutable obstacle.

Some obstacles 520 may not be easily identified as modifiable or immutable obstacles based on the sensor data and 3D start map. For these obstacles 520, the computer 120 may generate and execute a set of instructions to remove the obstacle. While executing the instructions, a forward kinematic analysis of the excavation vehicle 115 may indicate that the obstacle 520 is resisting removal, for example not breaking down or not being pushed to a new location. In such instances, the obstacle analysis module 705 identifies the resistant obstacles as immutable.

In the implementations described above, the threshold conditions (e.g., threshold slope, threshold height, and threshold width) describe geometric minimums for the excavation vehicle 115 to execute an avoidance sub-route. In some implementations, the threshold conditions are calibrated based on the dimensions of the excavation vehicle 115, for example the track length and track width, to avoid high-centering or rolling the vehicle. In alternate implementations, the obstacle analysis module 705 may implement a set of static threshold conditions or a parametric avoidance model to trigger an avoidance sub-route based on the height, width, length, slope, and/or physical profile of the obstacle.

The obstacle analysis module 705 may also detect an obstacle 520 based on the occurrence of one or more of a set of conditions describing the excavation vehicle 115 including, but not limited to, an engine load greater than the target engine load, a ground speed lower than the minimum ground speed, and a tool angle lower than a target tool angle. These inputs may be received by the sensors 170 and passed to the computer 120 for evaluation by the obstacle analysis module 705.

In some implementations, while navigating through the site 505, the tracks and drive train of the excavation vehicle 115 creates artificial obstacles, for example mounds of displaced earth, sinks created by the tracks of the excavation vehicle 115, or additional mounds of earth created by overflowing excavated earth within the tool. The obstacle analysis module 705 may track such artificial obstacles and dynamically updated both the unobstructed route 640 and the obstructed route 630 accordingly. To maintain excavation efficiency and reduce risk of the excavation vehicle 115 embedding within the ground surface, the obstacle analysis module 705 intermittently pauses the excavation of the hole 620 to remove artificial obstacles via appropriate removal tool paths. The obstacle analysis module 705 may identify an artificial feature once it exceeds a preset trigger threshold, for example a threshold height, depth, width, and/or slope.) Accordingly, the excavation vehicle 115 controls obstacles in its environment both before and during the excavation of the hole.

Beyond the methods and techniques described above, the obstacle analysis module 705 may implement any other methods or techniques to detect immutable and modifiable obstacles 520 in real-time during the generation of the 3D start map or from the 3D start map, to label regions of the 3D start map including the detected obstacles, and to avoid detected immutable obstacles. In other implementations, the excavation vehicle 115 may access a previously generated 3D start map from computer memory and implement similar techniques and methods to asynchronously detect and label obstacles within the site 505.

III.C. Route Generation

Having detected both modified and immutable obstacles within the site, the excavation vehicle must generate a set of routes traveling between two locations within the site, hereafter referred to as the start point 610 and the end point 620. To determine the most efficient route between the two locations, obstructed route generator 710 and the unobstructed route generator 715 generate all possible routes from the start point 610 and the end point 615, both circumventing modifiable obstacles and traveling through modifiable obstacles. Routes generated by the obstructed route generator 710 and include instructions, in the form of a set of removal tool paths, for removing and traveling over any modifiable obstacles, whereas routes generated by the unobstructed route generator travel around any modifiable obstacles. As a result obstructed routes feature shorter distances than unobstructed routes, but potentially result in expending a greater amount of resources. The tradeoff between distances of unobstructed routes and the resource costs associated with obstructed routes provides a need for the excavation vehicle 115 to determine the most efficient route between the start point 610 and the end point 620.

IV.A.1. Obstructed Route Generation

Regarding obstructed routes, the obstructed route generator 710 selects, based on the location of the site boundary 515 where the excavation vehicle 115 entered the site 505 and the location of the hole 540, a start point 610 and an end point 620. As illustrated in FIG. 6, the start point 610 is located where the excavation vehicle 115 enters the site 505 while the end point 620 is located where the excavation vehicle 115 enters the hole 540. Next, the obstructed route generator 710 identifies regions of the site 505 lying between the start point 610 and the end point 620 and identifies, for each of regions, any modifiable and immutable obstacles. Referring back to FIG. 6 as exemplary, the site 505 may have also included a second obstacle 640 located near the dump pile 530, but the obstacle has been filtered from the digital terrain model by the obstructed route generator 710 because it does not lie within a region between the start point 610 and the end point 620. Of the obstacles between the start point 610 and end point 620, the obstructed route generator 710 further identifies all the modifiable obstacles and generates several obstructed routes 630 traveling between at least one of the identified modifiable obstacles and circumventing all identified immutable obstacles. For example, if modifiable obstacles A, B, and C and immutable obstacle D lie between the start point 610 and the end point 620, the obstructed route generator 710 will generated obstructed routes 630 including routes through just obstacle A, B, or C, and all combinations of obstacles A, B, and C. As described above, all of the generated obstructed routes 630 would avoid the immutable obstacle D. In comparison to any unobstructed route 640 between the start point 610 and end point 620, any obstructed route 630 describes a shorter physical distance between the same points within the coordinate space.

Further, as introduced above in order to navigate the excavation vehicle 115 through obstacles 520, each obstructed route 630 will include a set of removal tool paths for removing the obstacle.

A removal tool path 660 describes instructions for navigating the excavation vehicle 115 over the obstacle in conjunction with adjusting the excavation tool to remove the modifiable obstacle. Here removal may include removing earth from mounds above the threshold height of the ground surface, as well as filling earth into sinks beneath the threshold height of the ground surface. Thus, in this context removal signifies making an area navigable by the EV by removing the obstacle from the set of objects the EV has to contend with, even if the process of removal involved adding dirt to a particular area within the site. Geometrically, because removal tools paths for obstructed routes 630 describe pathways between two coordinates in a coordinate space they are often linear, arcuate, or a combination of multiple linear or arcuate segments. Alternatively, tool paths providing instructions for excavating earth describe a variety of shapes in two or three dimensions, for example triangular pathways, hypertriangular pathways, rectangular pathways, hyperrectangular pathways, elliptical pathways, and hyperelliptical pathways.

In implementations in which the modifiable obstacle is a mound of earth above the threshold height of the ground surface, the obstructed route generator 710 generates a set of removal tool paths 660 with instructions for the excavation vehicle 115 to level the mound by removing earth, navigating to the dump pile 530, and depositing the removed earth at the dump pile 530. This process may be repeated periodically until the mound has been leveled to a threshold height. Similarly, in implementations in which the modifiable obstacle is a sink beneath the threshold height of the ground surface, obstructed route generator 710 generates a set of removal tool paths 660 with instructions for the excavation vehicle 115 to fill the sink by removing earth from the dump pile 630, navigating to the sink, and depositing earth to fill the sink. This process may be repeated periodically until the sink has been filled to the threshold height of the ground surface.

In some implementations, site 505 includes a plurality of modifiable obstacles 520—one or more mounds of earth and one or more sinks beneath the ground surface-between the start point 610 and the end point 620. The start point 610 and the end point 620 may represent points on the entry ramp 515 and the hole entry ramp 545, respectively. Alternatively, the starting point 610 and the end point 620 may describe any points within the coordinate space of the site. To improve efficiency, the obstructed route generator 710 may generate a set of removal tool paths 660 instructing the excavation vehicle 115 to level and remove earth from the one or more mounds and directly deposit the earth into the one or more sinks, without navigating to, depositing, or removing earth at the dump pile 530. In such an implementation, the set of removal tool paths 660 instruct the excavation vehicle 115 to navigate to a mound and fill its tool with earth from the mound, navigate to a sink, and release earth from the tool into the sink. This process is repeated until the mound is level with the threshold height of the ground surface or the sink has been filled to the threshold height of the ground surface. The mound and/or sink may be selected based on comparative measurements of the sizes or distances of the other mounds/sinks between the start point 610 and the end point 620 (e.g., the tallest or closest mound). After leveling a mound or filling a sink, the set of removal tool paths 660 may instruct the excavation vehicle 115 to navigate over the obstacle several times to compact the earth. Once either the mound or sink has been removed, the excavation vehicle 115 may navigate to the next mound or sink and repeat the above process until all the obstacles have been removed from the site 505. Leveling a mound or filling a sink may not need to be performed to the exact threshold height, but rather within an acceptable range of the threshold height (for example, 100 millimeters from the level with the threshold height).

If the volume of earth removed from one or more mounds exceeds the appropriate volume of earth for filling one or more sinks, the excavation vehicle 115 may evenly spread the earth across the regions between the start point 610 and the end point 620. Alternatively, the excavation vehicle 115 may dump the excess earth directly onto the dump pile 530. Similarly, if an appropriate volume of earth for filling one or more sinks exceeds the volume removed from one or more mounds, the set of removal tool paths 660 may instruct the excavation vehicle 115 to uniformly redistribute earth from mounds to sinks in the target area, such that all sinks are at a substantially similar height beneath the ground surface. The excavation vehicle 115 may further grade the regions between the start point 610 and the end point 620 by removing a relatively thin layer of earth from the regions and releasing the earth into the one or more sinks to bring them level with the threshold height of the ground surface.

As described above, a tool path may also describe the position and orientation of the tool mounted to the excavation vehicle 115. In some implementations, an obstacle 520 may need to be broken down in smaller components before being removed from a mound or a sink. To do so, a set of removal tool paths 660 may include instructions for the controller 150 to repetitively drive the leading edge of the tool downward into the earth around the location of the obstacle, running the leading edge of the tool over the location of the detected obstacle to "scape" or loosen this earth, and activating an alternate tool (not shown) to break down the obstacle. In another embodiment, after determining that an obstacle lies within the tool path traveled by the excavation vehicle 115, the obstructed route module 710 may halt the digging routine until a human operator can manually operate the excavation vehicle 115 or another excavation vehicle 115 to remove the obstacle.

Depending on the structural and physical properties of the obstacle, removing an obstacle may require multiple removal tool paths. As a result, a tool path may represent only a fraction of the steps executed to remove an obstacle from the site 505. For example, removing an obstacle may first require removing a volume of earth from a mound and then using the tool mounted to the excavation vehicle 115 to break down the obstacle into smaller pieces. Additionally, tool paths are defined based on several factors including, but not limited to, the composition of the soil, the properties of the tool being used to perform the excavation or removal of the obstacle, the properties of the drive system 210 moving the tool, and the properties of the excavation vehicle 115. Example properties of the tool and excavation vehicle 115 include the size of the tool, the weight of the tool, and the force exerted on the tool 175 in contact with the ground surface of the site 505.

IV.A.2. Unobstructed Route Generation

Regarding unobstructed routes, the unobstructed route generator 715 generates potential routes for the excavation vehicle 115 may travel from the start point 610 to the end point 620 while circumventing any modifiable obstacles located within regions between the two points. As illustrated in FIG. 6, the unobstructed route 640 represents a pathway from the start pint 610 to the end point 620 without crossing or coming into contact with the obstacle 520, unlike the obstructed route 630. In one implementation, the unobstructed route generator 715 presents an interface of the 3D start map generated by the start map generator 410 allowing an operator to define restrictions, for example restricted areas, around any obstacles prior to deploying the excavation vehicle 115 to navigate around the site 505. The interface, presented by the unobstructed route generator 715, receives input from the operator marking immutable and modifiable obstacles that may not have been initially detected by the sensors 170 by selecting the objects or drawing free-hand perimeters of various shapes around each obstacle. After receiving the input, the unobstructed route generator 715 removes the regions of the 3D start map including the selected obstacle such that the unobstructed route 640 does not traverse those regions. Once deployed, the excavation vehicle 115 navigates within the user-specified boundaries without entering the restricted areas including any modifiable or immutable obstacles. In an alternate implementation, the operator manually navigates the excavation vehicle 115 around the obstacles 520 within the site boundaries 515 to define the restrictions and allow the computer 120 to remove them from the 3D start map.

Restrictions implemented by the unobstructed route generator 715 to circumvent one or more obstacles include deviations in ground surface from a minimum elevation of an obstacle above the ground surface, a minimum depth of an obstacle below the ground surface, a minimum slope of an obstacle, and a minimum width and length of an obstacle. As described above in reference to immutable obstacles, the unobstructed route generator 715 may implement a parametric avoidance model for all obstacles between the start point 610 and end point 620 based the elevation of the obstacle above the ground surface, the depth of the obstacle below the ground surface, a length of the obstacle, a width of the obstacle, or a profile of the structural properties of the obstacle.

Similar to the interface presented by the unobstructed route generator 715, the obstructed route generator 710 may present a user interface allowing operators to identify modifiable and immutable obstacles within the site, to generate one or more obstructed routes between the start point 610 and the end point 620, or to modify and approve obstructed routes previously generated by the obstructed route generator 710. Graphically and functionally, the interface presented by the obstructed route generator 710 is similar to the interface presented by the unobstructed route generator 715.

III.D. Cost Function Evaluation and Route Selection

Once generated by either the obstructed route generator 710 or the unobstructed route generator 715, all potential obstructed routes and unobstructed routes are stored in the route store 720 to be accessed by the route optimizer 725. The route optimizer 725 evaluates, for each obstructed route 630 and each unobstructed route 640, a cost function describing the amount of resources that will be spent navigating the excavation vehicle 115 from the start point 610 to the end point 620 along each route to complete a designated task. In one implementation, the excavation vehicle 115 must navigate from the start point 645 to the end point 620 multiple times while excavating a hole, requiring multiple passes over a single route. For example, when excavating the hole, the excavation vehicle 115 may make multiple passes between a start point 610 at the hole 620 and an end point 620 at the dump pile 530. Accordingly, the cost function for any obstructed or unobstructed routes traversing that region accounts for the multiple passes performed to complete the excavation of the hole 620.

When evaluating the cost function for traveling over the obstructed route, the route optimizer 725 accounts for various conditions under which the excavation vehicle 115 would execute the appropriate set of removal tool paths 660. The cost function is evaluated based on one or more of the following: the rate at which the excavation vehicle 115 executes the set of instructions to complete the excavation, the average speed at which the excavation vehicle 115 navigates through the site 505, the distance between the start point and the end point over both obstructed and unobstructed route, the amount of fuel available to the excavation vehicle 115, the rate at which the excavation vehicle 115 uses the available fuel, the expected mechanical strain on the excavation vehicle 115, for example physical wear and tear on the exterior and interior machinations of the vehicle, the amount of noise associated with both the unobstructed and the obstructed route, and the proximity of risk averse areas to the unobstructed route. Mechanical strain on excavation vehicle 115 describes the physical wear and tear on the exterior and interior machinations and functionality of the vehicle 115. Risk averse areas describe conditions which may detrimentally effect the machinations and functionality of the excavation vehicle 115, for example wet earth, sharp rocks, or large bodies of water.

The cost function represents a combination of these weighted environmental conditions. Based on the data recorded by the sensors 170, the route optimizer 725 may assign integer values to each of the aforementioned conditions describing the severity of each one, for example on a scale from 0 to 1, values closer to 1 suggest a high, unfavorable resource cost. Additionally, based on the previous excavations within the site or at different sites, the route optimizer 725 generates weighted parameters to be assigned to each condition describing the significance of the parameter on the overall resource cost of the route. For example, if the amount of noise is determined to be of less importance than the amount of available fuel, the route optimizer 725 assigns a greater weight to the second condition than the first. To generate weight parameters for each condition, the route optimizer 725 is trained using training data from previously executed excavation routines or data gathered by a manual operator. In some implementations, the route optimizer 725 uses machine learning techniques including, for example, linear regression, decision trees, support vector machines, classifiers (e.g., Naïve Bayes classifier), fuzzy matching, and gradient boosting). Once generated, the route optimizer 725 evaluates the cost function by inputting information describing the various conditions to the cost function to determine a resource cost for each route or tool path.

When determining the resource cost to travel over the obstructed route, the route optimizer 725 accounts for the resource costs for the excavation vehicle 115 to execute the appropriate set of removal tool paths 660. As a result, the cost function associated with an obstructed route 630 describes the cost of resources to prepare the route by removing the obstacle in addition to the resource cost for the excavation vehicle 115 to travel over the route. In one implementation, the amount of resources to execute a set of removal tool paths 660 is accessed from computer memory. In other implementations, the excavation vehicle 115 executes the set of instructions prescribed by the set of removal tool paths 660 and records the cost of resources to do so during the generation of the digital terrain model.

Similarly to the obstructed tool path 630, when evaluating the cost function for the unobstructed route 640, the route optimizer 725 accounts for several considerations including, but not limited to, the rate at which the excavation vehicle 115 executes the set of instructions to complete the excavation tool path 670, the average speed at which the excavation vehicle 115 navigates through the site 505, and the distance between the start point 610 and the end point 620 over the unobstructed route 640. Generally, it may be assumed that obstructed and unobstructed routes being compared describe the same start point 610 and endpoint 620. However, in some implementations, for example, when ordering a set of tasks differentiated by locations within the site, routes describing different start points 610 and endpoints 620 may be compared instead. The cost function for the EV to navigate over the unobstructed route 640 is proportional to the measurement of the amount of earth to be excavated and the distance between the start point 610 and the end point 620 over the unobstructed route 640. Additionally, the cost function for the EV to navigate over the unobstructed route 640 is inversely proportional to the rate at which the excavation vehicle 115 executes the set of instructions for the execution tool path and the average speed at which the excavation vehicle 115 navigates through the site 505. In some implementations, the project time for the EV to navigate over the obstructed route 630 is based on similar relationships as those described above.

III.E. Route Navigation

Given the mechanical similarities of the equipment and excavation vehicle 115 implemented when navigating the unobstructed route 640 and the obstructed route 630, the differences in resource costs may be attributed to the additional resource costs for executing the set of removal tool paths 660 and the shorter distance of the obstructed route 630 versus the longer distance of the unobstructed route 640. Of the obstructed routes 630 and unobstructed routes 640 generated by the obstructed route generator 710 and unobstructed route generator 715, the route optimizer 725 selects a route with the lowest cost of resources. Because routes with lower resource costs indicate more efficient routes for traveling between the start point 610 and the end point 620, the route optimizer 725 selects the most efficient route by selecting the route with the lowest resource cost.

After selecting the route with the lowest resource cost, the navigation module 730 sends instructions to the hydraulic system of the excavation vehicle 115 to maneuver the drive system of the excavation vehicle 115 to navigate over coordinates prescribed within the selected route. In implementations in which the selected route is an obstructed route 630, the navigation module 730 additionally instructs the hydraulic system of the excavation vehicle 115 to adjust the position of the tool, maneuvering unit, or drive system to execute the set of removal tool paths 660. The navigation module 730 is configured to adjust the hydraulic capacity allocated to the drive system and to control the control 150 in following the tool path. Generally, the excavation vehicle 115 only has sufficient hydraulic pressure to power a single system as full capacity. As a result, both the drive and tool systems may be powered equivalently at half capacity. However, if a set of removal tool paths 660 call for an adjustment of the tool while navigating the excavation vehicle 115, the navigation module 730 may redistribute the hydraulic pressure within the system to favor the tool over the drive system (e.g., 75%-25% distribution, or otherwise). The calibration for the hydraulic system may be performed by observing joystick manipulations within the excavation vehicle 115 and recording the changes in pressure distribution. The remainder of this section describes a number of example operating conditions that can trigger hydraulic pressure adjustments and what those adjustments are.

In moving the tool through the set of removal tool paths 660, the navigation module 730 adjusts the distribution of hydraulic pressure between the drive system and the tool to favor the tool to reduce or increase the speed of the tool. While this may be accomplished in some instances by increasing the amount of hydraulic pressure capacity allocated to the drive system, the amount of hydraulic capacity available is finite and so this is not always a viable solution. In doing so, the navigation module 730 may adjust the tool to a greater depth below the ground surface, to a height above the ground surface, or to a different angle relative to the ground surface in order to remove an obstacle 520.

The maintenance of the hydraulic capacity in this manner and as described elsewhere herein prevents the excavation from stalling during the excavation routine or from complications regarding raising the excavation tool above the ground surface. In one embodiment, to further maintain sufficient hydraulic capacity for it to be possible to make adjustments to the position and orientation of the tool during the digging routine, the navigation module 730 maintains hydraulic pressure within the hydraulic system below a threshold 90% of the maximum hydraulic pressure capacity.

Additionally, navigation module 730 may maintain the hydraulic capacity of the hydraulic system and decrease the speed of the drive system by adjusting the distribution of hydraulic pressures. A decrease in speed results in a reduction of the overall hydraulic pressure in the hydraulic system, thereby ensuring sufficient scope in the hydraulic system to adjust the position and orientation of the tool and with minimal delay during the set of removal tool paths 660 or the digging routine. For example, if the hydraulic pressure within the system is 98% of the maximum hydraulic pressure, exceeding the threshold hydraulic pressure, the hydraulic distribution module 740 can reduce the target speed of the excavation vehicle 115 by dynamically executing instructions to divert hydraulic pressure from the drivetrain to the set of tool actuators. By redistributing hydraulic pressure away from the certain components of engine system and towards other components of the engine system, the hydraulic distribution module 740 can prioritize certain excavation functions and maintain high excavation efficiency by the tool and excavation vehicle 115.

IV. Example Process Flow

Figure 7B:
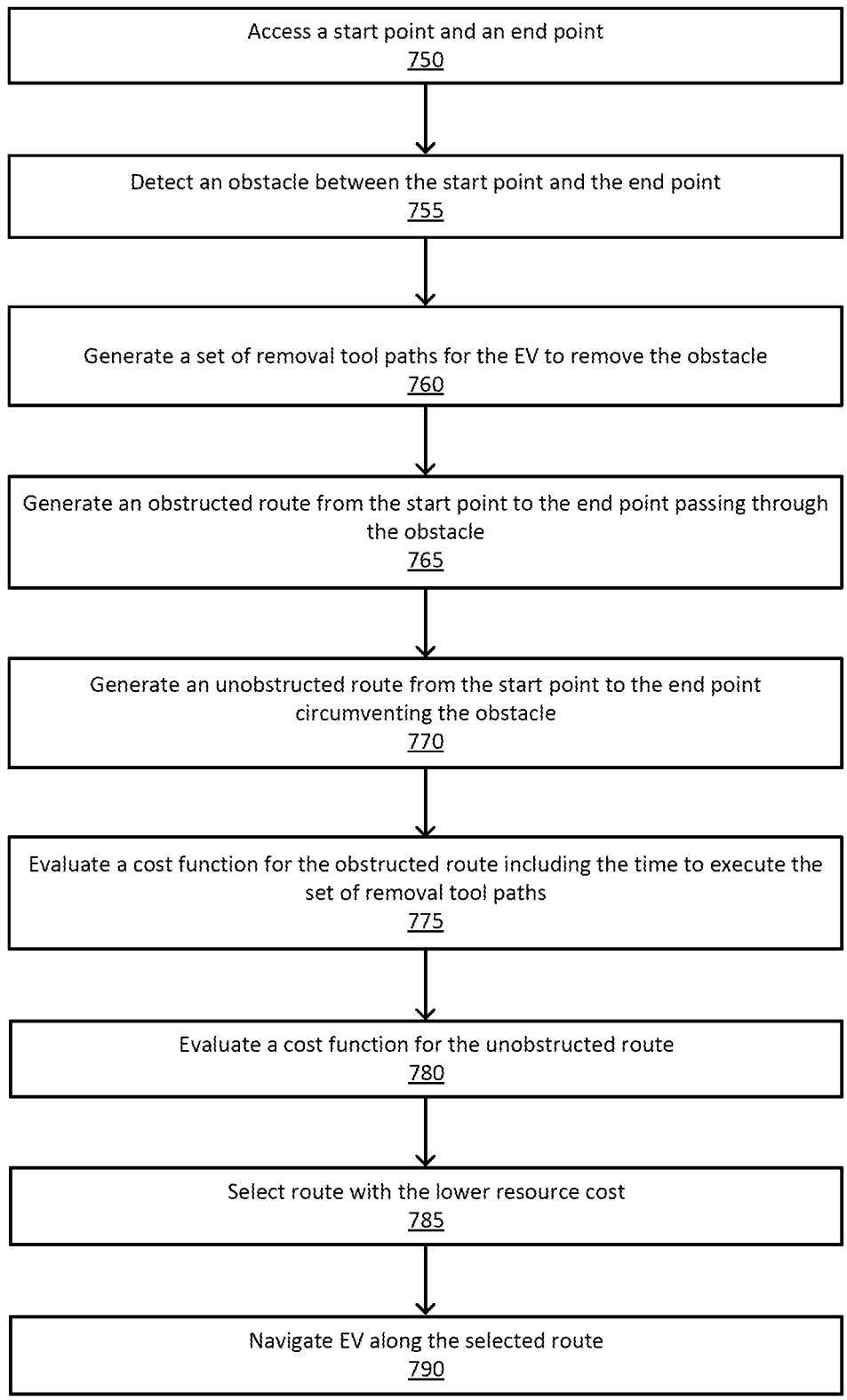
FIG. 7B shows an example flowchart describing the process for the route generation module to select the shortest route between two locations within the site, according to an embodiment.

To implement the system architecture of the route generation module, FIG. 7B shows an example flowchart describing the process for route generation module 700 to generate the shortest route between two locations within the site 505, according to an embodiment. As described above, the obstacle analysis module 705 accesses 750 a start point 610 and an endpoint 620 from the digital terrain model 500 and identifies regions of the site 505 that lie between the two points. For each region, the obstacle analysis module 705 detects 755 any immutable and modifiable obstacles 520 that lie within the identified regions. As described both immutable and modifiable obstacles 520 are identified based on structural characteristics and physical properties of the obstacle.

Modifiable obstacles 520 describe features which can be removed by the excavation vehicle 115, while immutable obstacles describe features which cannot be removed from the site 505 and must be avoided in both the obstructed route 630 and unobstructed route 640. For each modifiable obstacle 520, the obstructed route generator 710 generates 760 a set of removal tool paths 660 to guide the excavation vehicle 115 through removing the obstacle from the site 505, for example breaking down the obstacle using the tool mounted to the excavation vehicle 115, filling a sink beneath the ground surface with earth, and leveling a mound of earth above the ground surface. The obstructed route generator 710 generates 765 multiple obstructed routes 630 traveling through all combinations of the detected modifiable obstacles between the start point 610 and the end point 650. In implementations in which no modifiable obstacles 520 are detected, the obstructed route generator 710 does not generate an obstructed route 630. The shortest unobstructed route 640 generated by the unobstructed route generator 715 is selected for the excavation vehicle 115 to follow.

Similarly, the unobstructed route generator 715 generates 775 multiple unobstructed routes 640 from the start point 610 to the end point 620 circumventing both the modifiable and immutable obstacles. The multiple unobstructed routes 640 traverse from the start point 610 to the end point 620 from different directions and using different combinations of linear and arcuate segments, for example a first unobstructed route 640 may travel from the start point 610 to the end point 650 by circumventing an obstacle on the left side while a second unobstructed route 640 may circumvent the obstacle form the right side.

For each generated obstructed route 630, the route optimizer 725 determines 775 a resource cost including the resource cost for executing the set of removal tool paths 660. The route optimizer 725 determines 780 a project time for each unobstructed route 640. The route optimizer 725 may rank all the resource costs for the generated route and select 785 the route with the lowest resource cost. In implementations in which an unobstructed route 640 and obstructed route 630 have equal resource costs or resource costs within a threshold difference of each other, the route optimizer 725 selects the unobstructed route 640 to reduce the amount of work to be executed by the excavation vehicle 115. After selecting the route with the lowest resource cost, the navigation module 730 adjusts the hydraulic distribution of the excavation vehicle 115 to navigate 790 the excavation vehicle 115 along the selected route.

V. Supplementary Tool Paths

In some implementations, the excavation vehicle 115 may determine that an opportunity exists to decrease the resource cost of executing a set of excavation tool paths based on the surroundings within the site and current state of the site. Accordingly, the excavation vehicle 115 may execute one or more supplementary tool paths prior to, during, or after completing the set of excavation tool paths 660. In practice, supplementary tool paths improve the efficiency with which an excavation vehicle 115 is able to perform an excavation tool path 660. For example, the set of excavation tool paths 660 calls for a volume of earth to be excavated. However, when the excavation vehicle is positioned at the same height as the earth to be excavated, the excavation tool paths 660 may require several repetitions. To improve the efficiency, a supplementary tool path instructs the excavation vehicle 115 to move earth to form a bench at a height above the amount of earth to be excavated, thereby reducing the number of repetitions performed by the EV. For a supplementary tool path to be implemented in conjunction with the set of excavation tool paths 660, the route optimizer 725 determines that the change in resource cost for executing the supplementary time provides a net decrease in the overall project time for executing the set of excavation tool paths 660. Returning to the above example, if the project time for executing the excavation vehicle 115 to create the bench and execute the remainder of the excavation tool paths 660 is greater than the project time for executing the original set of excavation tool paths 660, the route optimizer 725 would select the original set of excavation tool paths 660. Operating similar to the process described above, supplementary tool paths may be implemented by an excavation vehicle 115 outside of the site boundaries or in an application beyond moving earth between locations within the site. For example, when moving material (i.e., earth, pallets, etc.) into a loading truck, the excavation vehicle 115 may determine that the loading bed of the truck is at a higher elevation than the ground surface from which the tool initially lifted the pallets. Adjusting the position of the tool a greater distance while carrying the load of pallets may require a significant amount of time to execute, but a greater clearance between the tool mounted to the excavation vehicle 115 and the material being moved may allow the tool to move faster due to the reduced risk of the tool bumping the loading bed or the truck. As a result, similar to the previous example, the route optimizer 725 may determine that executing a set of excavation tool paths 660 to construct a ramp out of earth reduces the overall resource cost of resources compared to carrying the pallets and adjusting the tool to a greater elevation.

Figure 8:
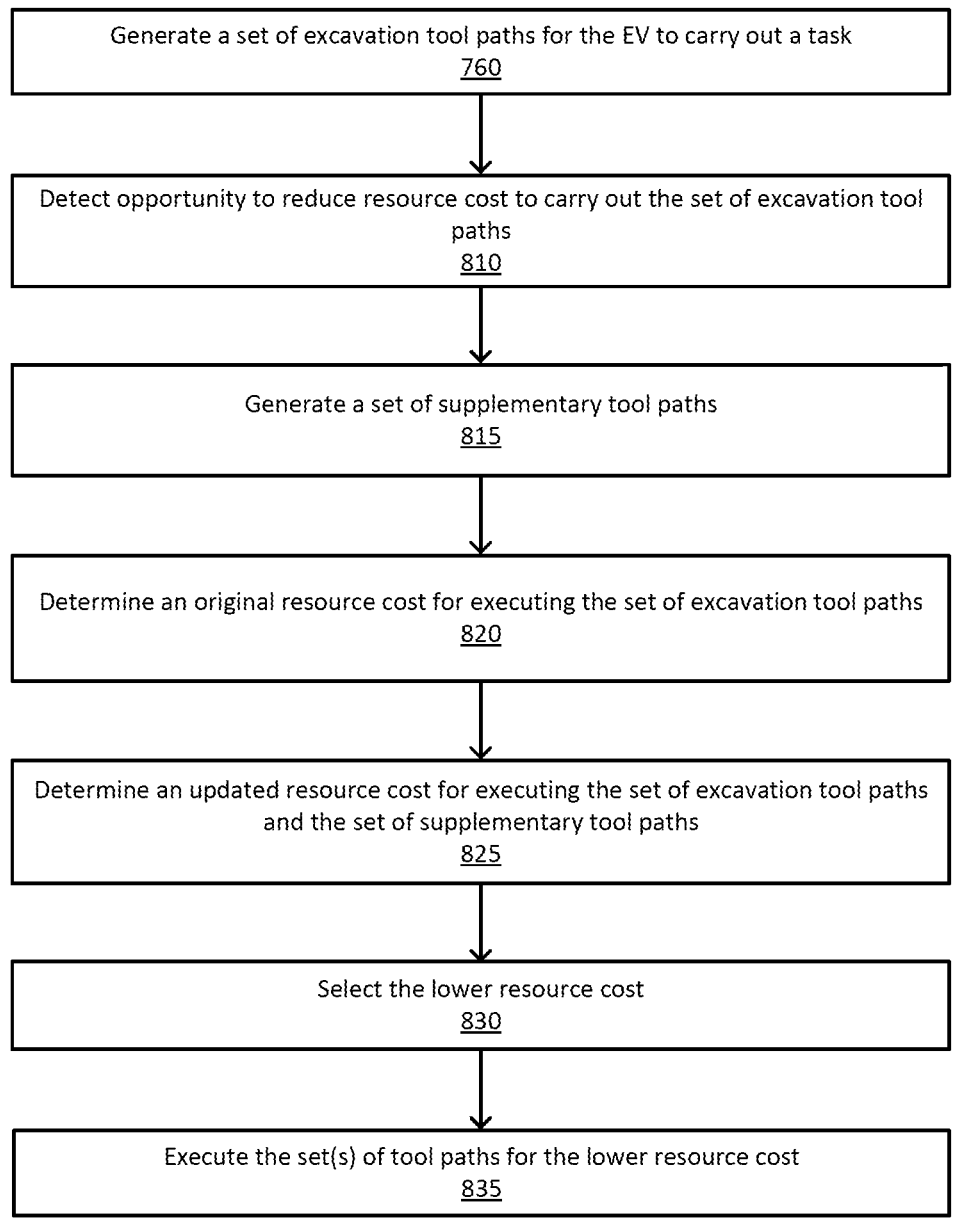
FIG. 8 shows an example flowchart describing the process for optimizing a set of removal tool paths, according to an embodiment.

FIG. 8 shows an example flowchart describing the process for optimizing a set of excavation tool paths, according to an embodiment. After detecting one or more modifiable obstacles within the site, the obstructed route generator 710 generates 760 a set of excavation tool paths 660 for the excavation vehicle to remove the obstacles 520. While evaluating the cost function associated with the set of excavation tool paths 660, the route optimizer 725 detects 810 that an opportunity exists to reduce the resource cost for executing the set of excavation tool paths 660 based on the current state of the site 505. For example, based on the current state of the site as described in the digital terrain model or as recorded by the sensors 135, remaining obstacles within the site may all be at an equivalent height above the ground surface. As a result, the route optimizer 725 generates 815 a set of supplementary tool paths instructing the excavation vehicle 115 to adjust and maintain the tool at a greater height than the obstacles, rather than adjusting the position of the tool at each obstacle. As another example, the route optimizer 125 may determine that enough loose earth exists within the site at a threshold distance allowing the excavation vehicle to quickly build a ramp to an obstacle. The route optimizer 725 determines 820 an original resource cost for the excavation vehicle 115 to execute the set of excavation tool paths and determines 825 an updated resource cost for the excavation vehicle 115 to execute the set of excavation tool paths including the resource cost to execute the set of supplementary tool paths. When more efficient, the updated resource cost is less than the original project time because the set of supplementary tool paths improved upon the less efficient aspects of the original resource cost. Similar to the selection between the obstructed and unobstructed routes, the route optimizer 725 selects 830 the lower resource cost and executes 835 the set of excavation tool paths associated with the selected resource cost.

VI. Additional Considerations

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for determining a route for an autonomous construction vehicle to navigate between a starting location and an ending location in a site, the method comprising:
   generating, by a computer communicatively coupled to the autonomous construction vehicle, a route between the starting location and the ending location, the starting location and the ending location represented as coordinates in a coordinate space of the site;
   performing, for the generated route, an operation that applies a cost function to determine a resource cost for the autonomous construction vehicle to navigate along the generated route between the starting location to the ending location, wherein the cost function considers a weighted combination of environmental conditions in the site that may affect navigation of the autonomous construction vehicle along the generated route;
   responsive to determining that the resource cost of the generated route does not satisfy a navigation condition, generating a modified route between the starting location and the ending location, the modified route comprising instructions for navigating the autonomous construction vehicle between the starting location and the ending location and removing an obstacle between the starting location and the ending location, wherein removing the obstacle and navigating the modified route is more efficient than navigating the generated route; and
   responsive to determining the modified route satisfies the navigation condition, navigating the autonomous construction vehicle along the modified route between the starting location and the ending location.

2. The method of claim 1, wherein an environmental condition of the weighted combination of environmental conditions considered by the cost function is a modifiable obstacle, and wherein generating the route between the starting location and the ending location comprises:
   generating instructions for removing the modifiable obstacle from the site by adjusting a position of a tool mounted to the autonomous construction vehicle, the instructions for removing the modifiable obstacle generated based on structural properties of the obstacle; and
   generating an obstructed route between the starting location and the ending location that includes the generated instructions for removing the modifiable obstacle.

3. The method of claim 1, wherein the environmental conditions comprise one or more of:
   an obstacle obstructing navigation of the autonomous construction vehicle from the starting location to the ending location;
   a condition causing physical wear and tear on a surface of the autonomous construction vehicle; and
   a risk averse area of the site, wherein conditions in the risk averse area of the site affect functionality of the autonomous construction vehicle.

4. The method of claim 1, wherein the resource cost of the generated route is directly proportional to one or more of:
   a distance between the starting location and the ending location;
   an expected mechanical strain on the autonomous construction vehicle during navigation along the generated route;
   a rate at which the autonomous construction vehicle uses fuel;
   an amount of noise associated with navigating along the generated route;
   a proximity of risk averse areas to the generated route;
   a project time for the autonomous construction vehicle to navigate along the generated route;
   a material and composition of earth between the starting location and the ending location; and
   a presence of an operator, a pedestrian, or an obstacle between the starting location and the ending location.

5. The method of claim 1, wherein the resource cost of the generated route is inversely proportional to one or more of:
   a rate at which the autonomous construction vehicle navigates along the generated route;
   an average speed at which the autonomous construction vehicle navigates through the site;
   an amount of fuel available to the autonomous construction vehicle;
   a distribution of hydraulic pressure in the autonomous construction vehicle; and
   a weight of a tool mounted to the autonomous construction vehicle.

6. The method of claim 1, further comprising:
   responsive to determining that the resource cost of the generated route does not satisfy the navigation condition, accessing a set of candidate routes between the starting location and the ending location, each candidate route of the set of candidate routes comprising unique instructions for navigating the autonomous construction vehicle from the starting location to the ending location;
   identifying, from the set of candidate routes, an alternate route from the set of candidate routes, wherein the alternate route satisfies the navigation condition; and
   navigating the autonomous construction vehicle along the alternate route from the starting location to the ending location.

7. The method of claim 1, wherein the generated route is an unobstructed route, the method further comprising:
   performing the operation that applies the cost function to the modified route to determine a resource cost of the modified route; and responsive to determining that the resource cost of the modified route satisfies the navigation condition, navigating the autonomous construction vehicle along the modified route from the starting location to the ending location.

8. The method of claim 1, wherein the generated route is an unobstructed route, the method further comprising:

responsive to determining that the resource cost of the generated route does not satisfy the navigation condition, generating a set of obstructed routes between the starting location and the ending location, each obstructed route of the set comprising unique instructions for navigating the autonomous construction vehicle through obstacles between the starting location and the ending location and instructions for removing the obstacles between the starting location and the ending location;

performing, for each obstructed route of the set of obstructed routes, the operation that applies the cost function to the obstructed route to determine a resource cost of the obstructed route;

selecting, from the set of obstructed routes, a candidate obstructed route, wherein the candidate obstructed route satisfies the navigation condition; and responsive to determining the resource cost of the candidate obstructed route satisfies the navigation condition, navigating the autonomous construction vehicle along the selected candidate obstructed route from the starting location to the ending location.

9. The method of claim 1, wherein the navigation condition is that the resource cost of the generated route is a lowest considered resource cost for navigating between the starting location and the ending location.

10. An autonomous construction vehicle comprising:

a computer communicatively coupled to a controller of the autonomous construction vehicle; and a non-transitory computer readable storage medium storing instructions determining a route for the vehicle between a starting location and an ending location in a site encoded thereon that, when executed by the computer, cause the computer to:

generate, by a computer communicatively coupled to the autonomous construction vehicle, a route between the starting location and the ending location, the starting location and the ending location represented as coordinates in a coordinate space of the site;

perform, for the generated route, an operation that applies a cost function to determine a resource cost for the autonomous construction vehicle to navigate along the generated route between the starting location to the ending location, wherein the cost function considers a weighted combination of environmental conditions in the site that may affect navigation of the autonomous construction vehicle along the generated route;

responsive to determining that the resource cost of the generated route does not satisfy a navigation condition, generate a modified route between the starting location and the ending location, the modified route comprising instructions for navigating the autonomous construction vehicle between the starting location and the ending location and removing an obstacle between the starting location and the ending location, wherein removing the obstacle and navigating the modified route is more efficient than navigating the generated route; and responsive to determining the modified route satisfies the navigation condition, navigate the autonomous construction vehicle along the modified route between the starting location and the ending location.

11. The autonomous construction vehicle of claim 10, wherein an environmental condition of the weighted combination of environmental conditions considered by the cost function is a modifiable obstacle, and wherein the instructions for generating the route between the starting location and the ending location further cause the computer to:

generate instructions for removing the modifiable obstacle from the site by adjusting a position of a tool mounted to the autonomous construction vehicle, the instructions for removing the modifiable obstacle generated based on structural properties of the obstacle; and generate an obstructed route between the starting location and the ending location that includes the generated instructions for removing the modifiable obstacle.

12. The autonomous construction vehicle of claim 10, wherein the environmental conditions comprise one or more of:

an obstacle obstructing navigation of the autonomous construction vehicle from the starting location to the ending location;

a condition causing physical wear and tear on a surface of the autonomous construction vehicle; and a risk averse area of the site, wherein conditions in the risk averse area of the site affect functionality of the autonomous construction vehicle.

13. The autonomous construction vehicle of claim 10, wherein the resource cost of the generated route is:

directly proportional to one or more of:
a distance between the starting location and the ending location;
an expected mechanical strain on the autonomous construction vehicle during navigation along the generated route;
a rate at which the autonomous construction vehicle uses fuel;
an amount of noise associated with navigating along the generated route;
a proximity of risk averse areas to the generated route;
a project time for the autonomous construction vehicle to navigate along the generated route;
a material and composition of earth between the starting location and the ending location; and
a presence of an operator, a pedestrian, or an obstacle between the starting location and the ending location; and inversely proportional to one or more of:
a rate at which the autonomous construction vehicle navigates along the generated route;
an average speed at which the autonomous construction vehicle navigates through the site;
an amount of fuel available to the autonomous construction vehicle;
a distribution of hydraulic pressure in the autonomous construction vehicle; and
a weight of a tool mounted to the autonomous construction vehicle.

14. The autonomous construction vehicle of claim 10, further comprising instructions that cause the computer to:

responsive to determining that the resource cost of the generated route does not satisfy the navigation condition, access a set of candidate routes between the starting location and the ending location, each candidate route of the set of candidate routes comprising unique instructions for navigating the autonomous construction vehicle from the starting location to the ending location;

identify, from the set of candidate routes, an alternate route from the set of candidate routes, wherein the alternate route satisfies the navigation condition; and navigate the autonomous construction vehicle along the alternate route from the starting location to the ending location.

15. The autonomous construction vehicle of claim 10, wherein the navigation condition is that the resource cost of the generated route is a lowest considered resource cost for navigating between the starting location and the ending location.

16. A non-transitory computer readable storage medium storing instructions determining a route for an autonomous construction vehicle between a starting location and an ending location in a site encoded thereon that, when executed by the computer, cause the computer to:

generate, by a computer communicatively coupled to the autonomous construction vehicle, a route between the starting location and the ending location, the starting location and the ending location represented as coordinates in a coordinate space of the site;

perform, for the generated route, an operation that applies a cost function to determine a resource cost for the autonomous construction vehicle to navigate along the generated route between the starting location to the ending location, wherein the cost function considers a weighted combination of environmental conditions in the site that may affect navigation of the autonomous construction vehicle along the generated route;

responsive to determining that the resource cost of the generated route satisfies a navigation condition, generate a modified route between the starting location and the ending location, the modified route comprising instructions for navigating the autonomous construction vehicle based on obstacles between the starting location and the ending location and removing an obstacle between the starting location and the ending location, wherein removing the obstacle and navigating the modified route is more efficient than navigating the generated route; and responsive to determining the modified route satisfies the navigation condition, navigate the autonomous construction vehicle along the modified route between the starting location and the ending location.

17. The non-transitory computer readable storage medium of claim 16, wherein an environmental condition of the weighted combination of environmental conditions considered by the cost function is a modifiable obstacle, and wherein generating the route between the starting location and the ending location comprises:

generating instructions for removing the modifiable obstacle from the site by adjusting a position of a tool mounted to the autonomous construction vehicle, the instructions for removing the modifiable obstacle generated based on structural properties of the obstacle; and generating an obstructed route between the starting location and the ending location that includes the generated instructions for removing the modifiable obstacle.

18. The non-transitory computer readable storage medium of claim 16, wherein the environmental conditions comprise one or more of:

an obstacle obstructing navigation of the autonomous construction vehicle from the starting location to the ending location;

a condition causing physical wear and tear on a surface of the autonomous construction vehicle; and a risk averse area of the site, wherein conditions in the risk averse area of the site affect functionality of the autonomous construction vehicle.

19. The non-transitory computer readable storage medium of claim 16, further comprising:

responsive to determining that the resource cost of the generated route does not satisfy the navigation condition, accessing a set of candidate routes between the starting location and the ending location, each candidate route of the set of candidate routes comprising unique instructions for navigating the autonomous construction vehicle from the starting location to the ending location;

identifying, from the set of candidate routes, an alternate route from the set of candidate routes, wherein the alternate route satisfies the navigation condition; and navigating the autonomous construction vehicle along the alternate route from the starting location to the ending location.

20. The non-transitory computer readable storage medium of claim 16, wherein the navigation condition is that the resource cost of the generated route is a lowest considered resource cost for navigating between the starting location and the ending location.

21. An autonomous construction vehicle comprising:

a processor; and a non-transitory computer readable storage medium storing instructions determining a route for the autonomous construction vehicle between a starting location and an ending location in a site encoded thereon that, when executed by the processor, cause the processor to:

generate, by the processor communicatively coupled to the autonomous construction vehicle, a route between the starting location and the ending location, the starting location and the ending location represented as coordinates in a coordinate space of the site;

perform, for the generated route, an operation that applies a cost function to determine a resource cost for the autonomous construction vehicle to navigate along the generated route between the starting location to the ending location, wherein the cost function considers a weighted combination of environmental conditions in the site that may affect navigation of the autonomous construction vehicle along the generated route;

responsive to determining that the resource cost of the generated route satisfies a navigation condition, generating a modified route between the starting location and the ending location, the modified route comprising instructions for navigating the autonomous construction vehicle based on obstacles between the starting location and the ending location; and responsive to determining the modified route satisfies the navigation condition, navigate the autonomous construction vehicle along the modified route between the starting location and the ending location.

* * * * *